(12) United States Patent
Kim et al.

(10) Patent No.: US 12,356,410 B2
(45) Date of Patent: Jul. 8, 2025

(54) UPLINK TRANSMISSION METHOD AND APPARATUS IN CELLULAR COMMUNICATION SYSTEM

(71) Applicant: Samsung Electronics Co., Ltd., Gyeonggi-do (KR)

(72) Inventors: Donghan Kim, Gyeonggi-do (KR); Jeongho Yeo, Gyeonggi-do (KR); Younsun Kim, Gyeonggi-do (KR); Juho Lee, Gyeonggi-do (KR); Heedon Gha, Gyeonggi-do (KR); Yongjun Kwak, Gyeonggi-do (KR); Youngbum Kim, Seoul (KR); Taehyoung Kim, Seoul (KR); Sungjin Park, Incheon (KR); Jinyoung Oh, Seoul (KR); Seunghoon Choi, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 97 days.

(21) Appl. No.: 18/103,021

(22) Filed: Jan. 30, 2023

(65) Prior Publication Data
US 2023/0180226 A1  Jun. 8, 2023

Related U.S. Application Data

(63) Continuation of application No. 16/856,606, filed on Apr. 23, 2020, now Pat. No. 11,570,799, which is a
(Continued)

(30) Foreign Application Priority Data
Nov. 23, 2016 (KR) .................. 10-2016-0156806

(51) Int. Cl.
H04W 72/21 (2023.01)
H04L 1/00 (2006.01)
(Continued)

(52) U.S. Cl.
CPC .......... *H04W 72/21* (2023.01); *H04L 1/0061* (2013.01); *H04L 5/0007* (2013.01);
(Continued)

(58) Field of Classification Search
CPC . H04W 72/21; H04W 76/10; H04W 72/1268; H04W 74/0833; H04L 1/0061;
(Continued)

(56) References Cited

U.S. PATENT DOCUMENTS 10,986,616 B2   4/2021  Kim et al.
2009/0011769 A1  1/2009  Park et al.
(Continued)

FOREIGN PATENT DOCUMENTS

CN   101159514   4/2008
CN   102318222   9/2010
(Continued)

OTHER PUBLICATIONS

PCT/ISA/210 Search Report issued on PCT/KR2017/013078, pp. 5.
(Continued)

*Primary Examiner* — Ronald B Abelson
(74) *Attorney, Agent, or Firm* — The Farrell Law Firm, P.C.

(57) ABSTRACT

The present disclosure relates to a communication technique for fusing, with an IoT technology, a 5G communication system for supporting a higher data transfer rate than a 4G system, and a system therefor. The present disclosure may be applied to intelligent services, such as smart homes, smart buildings, smart cities, smart cars or connected cars, health care, digital education, retail businesses, security and safety-related services, on the basis of 5G communication technologies and IoT-related technologies. Disclosed is a setting method for an efficient uplink signal transmission of a terminal in a case where a plurality of waveforms are
(Continued)

supported to efficiently operate an uplink in a next generation mobile communication.

8 Claims, 21 Drawing Sheets

Related U.S. Application Data continuation of application No. 16/463,658, filed as application No. PCT/KR2017/013078 on Nov. 17, 2017, now Pat. No. 10,986,616.

(51) Int. Cl.
H04L 5/00 (2006.01)
H04L 27/26 (2006.01)
H04W 72/12 (2023.01)
H04W 72/1268 (2023.01)
H04W 74/08 (2024.01)
H04W 74/0833 (2024.01)
H04W 76/10 (2018.01)

(52) U.S. Cl.
CPC ........ H04L 5/0044 (2013.01); H04L 27/2636 (2013.01); H04L 27/2678 (2013.01); H04W 72/1268 (2013.01); H04W 74/0833 (2013.01); H04W 76/10 (2018.02); H04L 1/003 (2013.01)

(58) Field of Classification Search
CPC . H04L 5/0007; H04L 5/0044; H04L 27/2636; H04L 72/1268
See application file for complete search history.

(56) References Cited

U.S. PATENT DOCUMENTS

| | | | |
|---|---|---|---|
| 2009/0070653 | A1 | 3/2009 | Kim et al. |
| 2010/0034152 | A1 | 2/2010 | Imamura |
| 2010/0208680 | A1 | 8/2010 | Nam et al. |
| 2011/0039590 | A1 | 2/2011 | Park et al. |
| 2011/0235604 | A1 | 9/2011 | Inoue et al. |
| 2011/0274043 | A1 | 11/2011 | Nam et al. |
| 2011/0317778 | A1 | 12/2011 | Hooli et al. |
| 2012/0243497 | A1 | 9/2012 | Chung et al. |
| 2012/0307775 | A1 | 12/2012 | Chung et al. |
| 2012/0320852 | A1 | 12/2012 | Seo et al. |
| 2012/0327875 | A1 | 12/2012 | Han et al. |
| 2012/0327884 | A1 | 12/2012 | Soo et al. |
| 2013/0262963 | A1 | 10/2013 | Kim et al. |
| 2013/0301571 | A1 | 11/2013 | Sorrentino |
| 2014/0056244 | A1 | 2/2014 | Frenne et al. |
| 2014/0105191 | A1 | 4/2014 | Yang et al. |
| 2014/0198663 | A1 | 7/2014 | Xu et al. |
| 2014/0362832 | A1 | 12/2014 | Rudolf et al. |
| 2015/0085797 | A1 | 3/2015 | Ji et al. |
| 2015/0092528 | A1 | 4/2015 | Luo et al. |
| 2015/0271802 | A1 | 9/2015 | Kang et al. |
| 2015/0319779 | A1 | 11/2015 | Li et al. |
| 2015/0341912 | A1 | 11/2015 | Kim et al. |
| 2016/0337086 | A1 | 11/2016 | Shen et al. |
| 2017/0134203 | A1 | 5/2017 | Zhu et al. |
| 2017/0170925 | A1 | 6/2017 | Xu et al. |
| 2018/0116000 | A1 | 4/2018 | Ly et al. |
| 2018/0123847 | A1 | 5/2018 | Xu et al. |
| 2019/0229860 | A1* | 7/2019 | Yoshimura ............ H04L 5/0007 |
| 2019/0297619 | A1 | 9/2019 | Liu et al. |
| 2020/0344016 | A1 | 10/2020 | Yoshimura et al. |

FOREIGN PATENT DOCUMENTS

| | | |
|---|---|---|
| CN | 101821980 | 1/2012 |
| CN | 102714565 | 10/2012 |
| CN | 102845038 | 12/2012 |
| CN | 102859915 | 1/2013 |
| CN | 103441816 | 12/2013 |
| CN | 104254995 | 12/2014 |
| CN | 104811283 | 7/2015 |
| CN | 104813727 | 7/2015 |
| CN | 105099627 | 11/2015 |
| CN | 105530072 | 4/2016 |
| CN | 105991257 | 10/2016 |
| EP | 2 813 025 | 12/2014 |
| EP | 2 938 153 | 10/2015 |
| EP | 3 522 471 | 8/2019 |
| EP | 3 533 276 | 9/2019 |
| EP | 3 537 677 | 9/2019 |
| WO | WO 2013/119160 | 8/2013 |
| WO | WO 2016/165575 | 10/2016 |
| WO | WO 2018/012637 | 1/2018 |
| WO | WO 2018/081385 | 5/2018 |

OTHER PUBLICATIONS

PCT/ISA/237 Written Opinion issued on PCT/KR2017/013078, pp. 8.
Qualcomm Incorporated, 3GPP TSG-RAN WG1 Meeting #87, R1-1612075, Nov. 5, 2016, Reno, USA, UL waveform configuration, pp. 8.
Guangdong OPPO Mobile Telecom, 3GPP TSG RAN WG1 Meeting #87, R1-1611705, Nov. 4, 2016, Reno, USA, Waveform selection for uplink control signal, pp. 7.
Intel Corporation, 3GPP TSG RAN WG1 Meeting #87, R1-1612167, Nov. 6, 2016, Reno, USA, Further considerations on NR waveform with improved spectral containment, pp. 7.
European Search Report dated Sep. 24, 2019 issued in counterpart application No. 17873891.0-1231, 11 pages.
Fujitsu, "Introduction of Physical Layer Aspects for CoMP", R1-123920, 3GPP TSG-RAN WG1 Meeting #70, Aug. 13-17, 2012, 5 pages.
Chinese Office Action dated Aug. 10, 2021 issued in counterpart application No. 201780072684.8, 31 pages.
Huawei (Rapporteur), "Introduction of NB-Iot", R2-163218, 3GPP TSG-RAN WG2 NB-Iot Ad-hoc#2, May 3-4, 2016, 86 pages.
Chinese Office Action dated May 16, 2022 issued in counterpart application No. 201780072684.8, 10 pages.
U.S. Office Action dated Aug. 8, 2022 issued in counterpart U.S. Appl. No. 16/856,485, 8 pages.
Australian Examination Report dated Feb. 14, 2023 issued in counterpart application No. 2022203746, 3 pages.
3GPP TS 36.116 V1.0.0, 3rd Generation Partnership Project; Technical Specification Group Radio Access Network; Evolved Universal Terrestrial.
Radio Access (E-UTRA); Relay Radio Transmission and Reception (Release 11), Sep. 2011, 34 pages.
Australian Examination Report dated May 31, 2023 issued in count Berpart application No. 2022203746, 4 pages.
Chinese Office Action dated Aug. 10, 2023 issued in counterpart application No. 202210577717.7, 18 pages.
EP Summons for Oral Proceedings dated Jul. 11, 2023 issued in counterpart application No. 17873891.0, 5 pages.
KR Decision of Patent dated Aug. 8, 2023 issued in counterpart application No. 10-2016-0156806, 7 pages.
Chinese Office Action dated Jan. 11, 2024 issued in counterpart application No. 202210577719.6, 14 pages.
Indian Hearing Notice dated Dec. 12, 2023 issued in counterpart application No. 201937020438, 3 pages.
LG Electronics, "On the Consideration of CRC Attachment", R1-073504, 3GPP TSG RAN WG1 Meeting #50, Aug. 20-24, 2007, 3 pages.
Chinese Office Action dated Apr. 17, 2024 issued in counterpart application No. 202210577719.6, 14 pages.
European Search Report dated Apr. 12, 2024 issued in counterpart application No. 23215007.8-1203, 11 pages.
EP Summons to Attend Oral Proceedings dated Mar. 11, 2024 issued in counterpart application No. 20216320.0-1203, 8 pages.
CN Rejection Decision dated Aug. 8, 2024 issued in counterpart application No. 202210577719.6, 12 pages.

(56) References Cited

OTHER PUBLICATIONS

EP Decision to Refuse dated Dec. 23, 2024 issued in counterpart application No. 20216320.0-1203, 17 pages.

\* cited by examiner

UPLINK TRANSMISSION METHOD AND APPARATUS IN CELLULAR COMMUNICATION SYSTEM

PRIORITY

This application is a Continuation of U.S. patent application Ser. No. 16/856,606, which was filed with the U.S. Patent and Trademark Office (USPTO) on Apr. 23, 2020, which is a Continuation of U.S. patent application Ser. No. 16/463,658, which was filed with the USPTO on May 23, 2019, issued as U.S. Pat. No. 10,986,616 on Apr. 20, 2021, as a National Phase Entry of PCT International Application No. PCT/KR2017/013078, which was filed on Nov. 17, 2017, and claims priority to Korean Patent Application No. 10-2016-0156806, which was filed on Nov. 23, 2016, the entire content of each of which is incorporated herein by reference.

BACKGROUND

1. Field

The present invention relates to a wireless communication system and, in particular, to a method and apparatus for transmitting/receiving a signal in a next generation mobile communication system.

2. Related Art

To meet the increased demand for wireless data traffic since the deployment of 4G communication systems, efforts have been made to develop an improved 5G or pre-5G communication system. Therefore, the 5G or pre-5G communication system is also called a "Beyond 4G Network" or a "Post LTE System". Implementation of the 5G communication system in higher frequency (mmWave) bands, e.g., 60 GHz bands, is being considered in order to accomplish higher data rates. To decrease propagation loss of radio waves and increase the transmission distance, beamforming, massive multiple-input multiple-output (MIMO), Full Dimensional MIMO (FD-MIMO), array antenna, analog beam forming, and large scale antenna techniques are being discussed for the 5G communication system. In addition, in the 5G communication system, there are developments under way for system network improvement based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation, and the like. In the 5G system, Hybrid FSK and QAM Modulation (FQAM) and sliding window superposition coding (SWSC) as advanced coding modulation (ACM) and filter bank multi carrier (FBMC), non-orthogonal multiple access (NOMA), and sparse code multiple access (SCMA) as advanced access technology have been developed.

The Internet, which is a human centered connectivity network where humans generate and consume information, is now evolving into the Internet of Things (IoT) where distributed entities, such as things, exchange and process information without human intervention. The Internet of Everything (IoE), which is a combination of IoT technology and Big Data processing technology through connection with a cloud server, has emerged. As technology elements, such as "sensing technology", "wired/wireless communication and network infrastructure", "service interface technology", and "security technology" have been demanded for IoT implementation, recently there has been research into a sensor network, Machine-to-Machine (M2M) communication, Machine Type Communication (MTC), and so forth. Such an IoT environment may provide intelligent Internet technology services that create new values for human life by collecting and analyzing data generated among connected things. The IoT may be applied to a variety of fields including smart home, smart building, smart city, smart car or connected cars, smart grid, health care, smart appliances, and advanced medical services through convergence and combination between existing Information Technology (IT) and various industrial applications.

In line with these developments, various attempts have been made to apply the 5G communication system to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be an example of convergence between the 5G technology and the IoT technology.

Recent researches are devoted to support multiple waveforms for operating uplink efficiently in a next generation mobile communication system, which requires a method for efficiently scheduling uplink signal transmissions of terminals. For efficient data transmission, there is a need of a method for determining a size of a code block (CB) and transmitting/receiving data based on the determined CB size.

SUMMARY

The present invention proposes a method for a terminal in the state of performing initial attachment or in a connected state to determine a waveform the use in an uplink transmission autonomously and a method and apparatus for a base station to configure the waveform for use by the terminal in the uplink transmission. The present invention provides a method for segmenting a transport block (TB) by the maximum CB size that is reported by a terminal or configured by a base station.

In accordance with an aspect of the present invention, a method is provided for a terminal in a wireless communication system. The method includes determining a maximum code block size based on a transport block size and modulation and coding scheme (MCS) information; determining a number of code blocks for the transport block; and segmenting the transport block into the determined number of code blocks.

In accordance with another aspect of the present invention, a method is provided for a base station in a wireless communication system. The method includes determining a maximum code block size based on a transport block size and MCS information; determining a number of code blocks for the transport block; and segmenting the transport block into the determined number of code blocks.

In accordance with another aspect of the present invention, a terminal is provided for use in a wireless communication system. The terminal includes a transceiver; and a controller configured to determine a maximum code block size based on a transport block size and MCS information, determine a number of code blocks for the transport block, and segment the transport block into the determined number of code blocks.

In accordance with yet another aspect of the present invention a base station is provided for use in a wireless communication system. The base station includes a transceiver; and a controller configured to determine a maximum code block size based on a transport block size and MCS information, determine a number of code blocks for the transport block, and segment the transport block into the determined number of code blocks.

The present invention is advantageous in terms that a terminal and a base station are capable of performing uplink transmission/reception efficiently in a situation where multiple waveforms are in use for uplink. The present invention is also advantageous in terms of reducing unnecessary data transmission based on efficiently data transmission between a terminal and a base station.

BRIEF DESCRIPTION OF DRAWINGS

The above and other aspects, features and advantages of certain embodiments of the disclosure will be more apparent from the following detailed description taken in conjunction with the accompanying drawings, in which.

DETAILED DESCRIPTION

Figure 1:
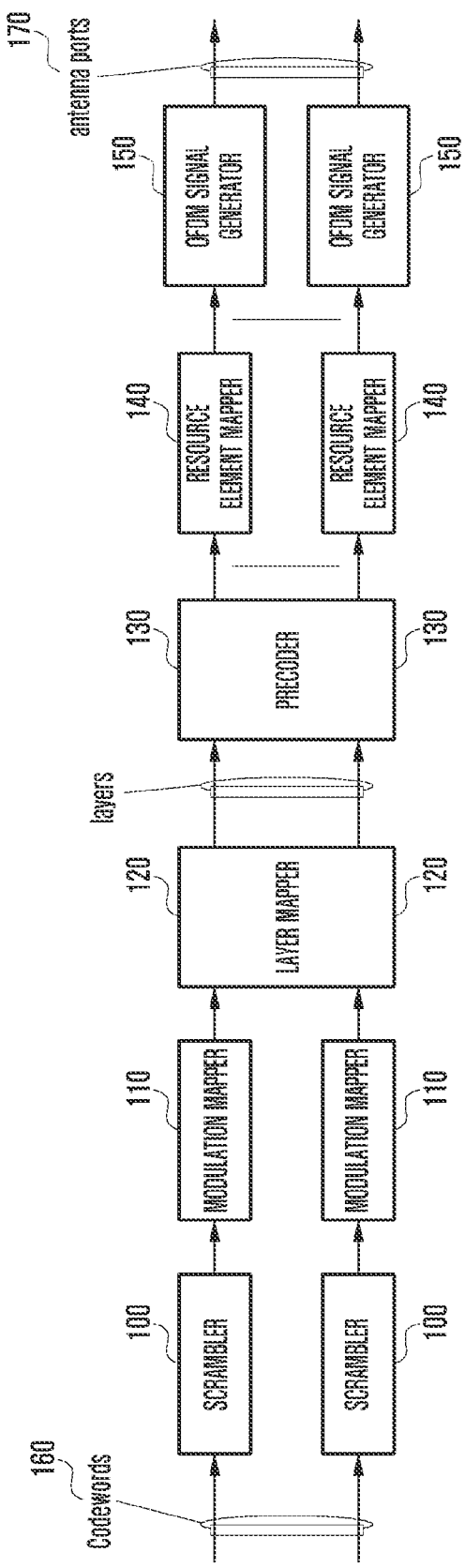
FIG. 1 is a diagram illustrating a configuration of a transmitter of a base station for transmitting a downlink signal in a legacy LTE system.

Exemplary embodiments of the present invention are described in detail with reference to the accompanying drawings. Detailed description of well-known functions and structures incorporated herein may be omitted to avoid obscuring the subject matter of the present invention. Further, the following terms are defined in consideration of the functionality in the present invention, and may vary according to the intention of a user or an operator, usage, etc. Therefore, the definition should be made on the basis of the overall content of the present specification.

Advantages and features of the present invention and methods of accomplishing the same may be understood more readily by reference to the following detailed description of exemplary embodiments and the accompanying drawings. The present invention may, however, be embodied in many different forms and should not be construed as being limited to the exemplary embodiments set forth herein; rather, these exemplary embodiments are provided so that this invention will be thorough and complete and will fully convey the concept of the invention to those skilled in the art, and the present invention will only be defined by the appended claims. Like reference numerals refer to like elements throughout the specification.

It will be understood that each block of the flowcharts and/or block diagrams, and combinations of blocks in the flowcharts and/or block diagrams, can be implemented by computer program instructions. These computer program instructions may be provided to a processor of a general-purpose computer, special purpose computer, or other programmable data processing apparatus, such that the instructions that are executed via the processor of the computer or other programmable data processing apparatus create means for implementing the functions/acts specified in the flowcharts and/or block diagrams. These computer program instructions may also be stored in a non-transitory computer-readable memory that can direct a computer or other programmable data processing apparatus to function in a particular manner, such that the instructions stored in the non-transitory computer-readable memory produce articles of manufacture embedding instruction means that implement the function/act specified in the flowcharts and/or block diagrams. The computer program instructions may also be loaded onto a computer or other programmable data processing apparatus to cause a series of operational steps to be performed on the computer or other programmable apparatus to produce a computer implemented process such that the instructions that are executed on the computer or other programmable apparatus provide steps for implementing the functions/acts specified in the flowcharts and/or block diagrams.

Furthermore, the respective block diagrams may illustrate parts of modules, segments, or codes including at least one or more executable instructions for performing specific logic function(s). Moreover, it should be noted that the functions of the blocks may be performed in a different order in several modifications. For example, two successive blocks may be performed substantially at the same time, or may be performed in reverse order according to their functions.

According to various embodiments of the present invention, the term "module", means, but is not limited to, a software or hardware component, such as a Field Programmable Gate Array (FPGA) or Application Specific Integrated Circuit (ASIC), which performs certain tasks. A module may advantageously be configured to reside on the addressable storage medium and configured to be executed on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionalities of the components and modules may be combined into fewer components and modules or further separated into more components and modules. In addition, the components and modules may be implemented such that they execute one or more CPUs in a device or a secure multimedia card. According to various embodiments of the present invention, a module may include one or more processors.

Embodiment 1

The mobile communication system has evolved to a high-speed, high-quality packet data communication system (such as High Speed Packet Access (HSPA), LTE (or evolved universal terrestrial radio access (E-UTRA)), LTE-Advanced (LTE-A), and LTE-Pro defined in $3^{rd}$ Generation Partnership Project (3GPP), High Rate Packet Data (HRPD) defined in $3^{rd}$ Generation Partnership Project-2 (3GPP2), Ultra Mobile Broadband (UMB), and 802.16e defined in IEEE)) capable of providing high-speed high-quality packet data services beyond the early voice-oriented services.

The LTE system as one of the representative broadband wireless communication systems uses orthogonal frequency division multiplexing (OFDM) in the downlink (DL) and discrete Fourier transform-spread-OFDM-based (DFT-S-OFDM-based) single carrier frequency division multiple access (SC-FDMA) in the uplink (UL). The term "uplink" denotes a radio link for transmitting data or control signals from a terminal that is interchangeably referred to as user equipment (UE) and mobile station (MS) to a base station (BS) that is interchangeably referred to as evolved node B (eNB), and the term "downlink" denotes a radio link for transmitting data or control signals from a base station to a terminal. Such multiple access schemes are characterized by allocating the time-frequency resources for transmitting user-specific data and control information without being overlapped with each other, i.e., maintaining orthogonality, so as to distinguish among user-specific data and control information.

As a next generation communication system after LTE, the 5G communication system should be designed to meet various requirements of services demanded by users and service providers. The services supported by 5G systems may be categorized into three categories: enhanced mobile broadband (eMBB), massive machine type communications (mMTC), and ultra-reliable and low-latency communications (URLLC).

The eMBB aims to provide exceptionally high data rate in comparison with those supported by the legacy LTE, LTE-A, and LTE-A Pro. For example, the eMBB aims to increase the peak data rate up to 20 Gbps in DL and 10 Gbps in UL per base station. Simultaneously, it aims to increase the user-perceived data rate. In order to meet such requirements, it is necessary to improve signal transmission/reception technologies including multi-input multi-output (MIMO) technique. The data rate requirements for the 5G communication systems may be met by use of a frequency bandwidth broader than 20 MHz in the frequency band of 3 to 6 GHz or above 6 GHz instead of the current LTE band of 2 GHz.

Meanwhile, the mMTC is considered to support application services for Internet of Things (IoT). In order to provide mMTC-based IoT application services effectively, it is required to secure massive access resources for terminals within a cell, improve terminal coverage and battery life span, and reduce device manufacturing cost. The IoT services should be designed to support a large amount of terminals (e.g., 1,000,000 terminals/km$^2$) within a cell in consideration by the nature of the IoT terminals that are attached to various sensors and devices for providing a communication function. By the nature of the IoT services, the mMTC terminals are likely to be located in coverage holes such as basement of a building, which requires broader coverage in comparison with other services being supported in the 5G communication system. The mMTC terminals that are characterized by their low prices and battery replacement difficulty should be designed to have very long battery lifetime.

Finally, the URLLC is targeted for mission-critical cellular-based communication services such as remote robot and machinery control, industrial automation, unmanned aerial vehicle, remote health care, and emergency alert services that are requiring ultra-low latency and ultra-high reliability. For example, a URLLC service needs to meet the requirements of air-interface latency lower than 0.5 ms and packet error rate equal to or less than 10'. In this respect, in order to support the URLLC services, the 5G system has to support transmit time intervals (TTI) shorter than those of other services and assign broad resources in the frequency band.

As described above, the 5G communication system should be designed to support the different requirements for various services and schedule uplink transmissions in consideration of the different requirements. For a terminal located at the center of a micro cell or a macro cell where the channel condition or signal-to-interference-plus-noise ratio (SINR) is relatively good, it is preferred to maximize the data rate of the terminal. Meanwhile, for the case of a terminal located at an edge of the macro cell where the channel condition or SINR is bad, it is preferred to secure coverage. The LTE system employs DFT-S-OFM-based waveforms in uplink. However, in the 5G communication system, both the OFDM and DFT-S-OFDM are considered for uplink transmission to optimize the coverage and data rated in adaptation to the situation of the terminal.

FIG. 1 is a diagram illustrating a configuration of a transmitter of a base station for transmitting a downlink signal in a legacy LTE system.

As shown in FIG. 1, the transmitter of the base station for transmitting an LTE downlink signal includes scramblers 100, modulation mappers 110, a layer mapper 120, a precoder 130, resource element mappers 140, and OFDM signal generators 150.

The scramblers 100 receive data encoded with a forward error correction code from an upper layer. Here, the forward error correction code-based encoding is performed for detecting and correct potential bit errors in communication between a terminal and a base station by encoding a bit string with a convolutional code, a turbo code, or a low density parity check code (LDPC). The scrambler 100 scrambles an encoded input data stream to eliminate influence of an inter-cell interference. The transmitter of the base station may include multiple scramblers 100 for processing multiple codewords 160 from the upper layer. After being scrambled, the codewords 160 are input to the modulation mappers 110.

The modulation mappers 110 perform modulation for transmitting baseband codewords efficiently over an RF. The modulation mappers 110 modulate the input codewords 160 into binary phase shift keying (BPSK), quadrature phase shift keying (QPSK), or quadrature amplitude modulation (QAM) symbols according to an upper layer configuration.

The layer mapper 120 maps the modulated symbols to layers properly according to a transmission mode. The precoder 130 performs precoding on the layer-mapped signals according to the transmission mode. The pre-coded symbols are transferred to the resource element mappers 140 corresponding to respective antenna ports according to a number of antenna ports 170.

The resource element mapper 140 map the pre-coded symbol to resource elements on time and frequency resources as scheduled by a scheduler per terminal. The signals mapped to the corresponding resource elements by the resource element mapper 140 are input to the OFDM signal generators 150, which convert the input signals to OFDM signals, which pass through an digital-to-analog converter (DAC) and an RF unit and then are transmitted by the antenna.

Figure 2:
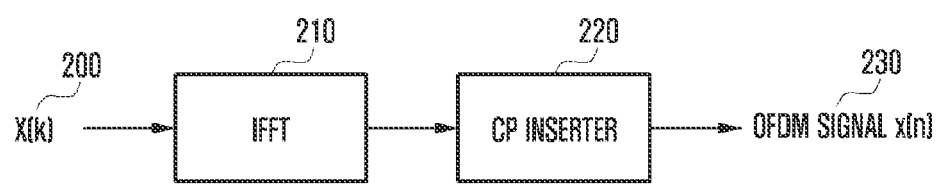
FIG. 2 is a block diagram illustrating a configuration of an OFDM signal generator for transmitting a downlink signal in a legacy LTE system.

FIG. 2 is a block diagram illustrating a configuration of an OFDM signal generator for transmitting a downlink signal in a legacy LTE system.

In FIG. 2, the OFDM signal generator includes an inverse fast Fourier transform unit (IFFT) 210 and a cyclic prefix (CP) inserter 220. The IFFT 210 performs an inverse Fourier transform on an input symbol X(k). The symbol X(k) 200 is identical with the time and frequency region symbol mapped to corresponding resources as scheduled by a base station as shown in FIG. 1. Typically, the IFFT 100 has a size of $2^N$ (N is a natural number greater than 1). Typically, the size of the IFFT 210 is greater than K (K is the number of X(k) input to the IFFT 210), and $2^N$-K inputs of the $2^N$ inputs for the corresponding carriers are filled with "0" values.

The CP inserter 220 inserts a CP to the IFFT'ed time domain signals to generate signals robust to a multipath channel. A length of the CP is determined according to a delay spread of the multipath channel experienced by a terminal. The CP-inserted signal x(n) may pass through a DAC and an RF module and then be transmitted to the terminal via an antenna.

The OFDM signal of FIG. 2 is generated by Equation 1.

$$x(n) = \frac{1}{\sqrt{N}} \sum_{k=0}^{K-1} X(k) \cdot e^{j2\pi nk/N}, n = -N_{CP}, \ldots 0, \ldots (N-1) \quad \text{[Equation 1]}$$

Here, X(k) denotes a QAM symbol to be OFDM-modulated, and x(n) denotes a time domain signal OFDM-modulated as described with reference to FIG. 1. In Equation 1, N denotes the size of IFFT, and $N_{CP}$ denotes the length of a CP being inserted to the transmit signal to generate the OFDM signal robust to the multipath channel. In Equation 1, K denotes the size of a frequency domain signal X(k).

Typically, the OFDM signal generated by Equation 1 as described with reference to FIGS. 1 and 2 has advantages as follows in comparison with the a single carrier-based transmission system.

The OFDM-based communication system is advantageous in terms of compensating the influence of multi-path fading effect caused by multi-path delays between a transmitter and a receiver with a one-tap equalizer by dividing a broad frequency band for a mobile communication system into a plurality of narrowband subcarriers and transmitting signals on the respective subcarriers. It is also advantageous to be able to effectively cancel an inter-symbol interference (ISI) caused by multi-path delays by inserting the CP. For these reasons, it is known that the OFDM is superior to the single carrier-based DFT-S-OFDM in data rate.

Unlike the LTE system in which the OFDM is used only for uplink, it is considered to use OFDM waveforms for both the uplink and downlink in the 5G communication system. It the OFDM is used in uplink, this may improve the uplink data rate and make it possible to cancel the interference caused uplink signals transmitted by terminals located in neighboring cells to the downlink signal being received by the terminal in a time division duplexing (TDD) system.

Figure 3:
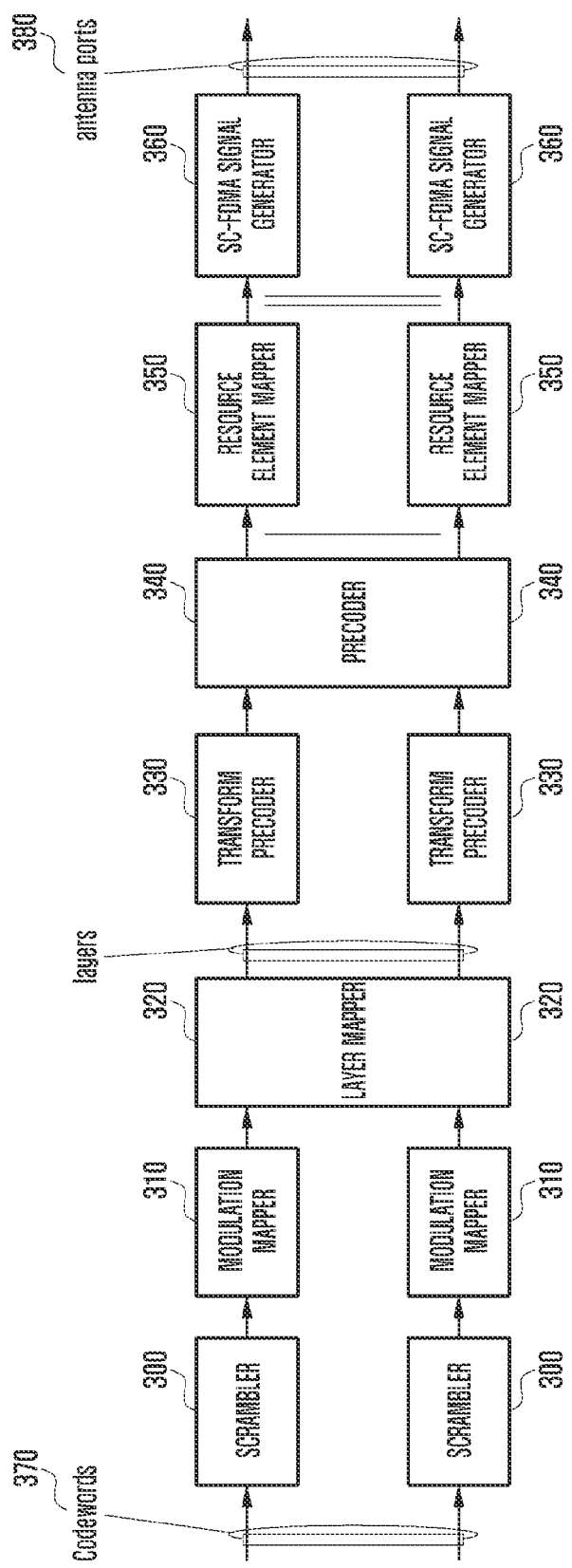
FIG. 3 is a diagram illustrating a configuration of a transmitter of a terminal for transmitting an uplink signal in a legacy LTE system.

FIG. 3 is a diagram illustrating a configuration of a transmitter of a terminal for transmitting an uplink signal in a legacy LTE system.

In FIG. 3, the transmitter of the terminal for transmitting an LTE uplink signal includes scramblers 300, modulation mappers 310, a layer mapper 300, transform precoders 330, a precoder 340, resource element mappers 350, and SC-FDMA signal generators (OFDM signal generators) 360.

The scramblers 100 receive data encoded with a forward error correction code from an upper layer. Here, the forward error correction code-based encoding is performed for detecting and correct potential bit errors in communication between a terminal and a base station by encoding a bit string with a convolutional code, a turbo code, or a LDPC. The scrambler 100 scrambles an encoded input data stream to eliminate influence of an inter-cell interference. The transmitter of the terminal may include multiple scramblers 300 for processing multiple codewords 370 from the upper layer.

After being scrambled, the codewords 370 are input to the modulation mappers 310. The modulation mappers 310 perform modulation for transmitting baseband codewords efficiently over an RF. The modulation mappers 310 modulate the input codewords 370 into BPSK, QPSK, or QAM symbols according to an upper layer configuration.

The layer mapper 320 maps the modulated symbols to layers properly according to a transmission mode. The layer mapped signal is input to a transform precoder 330 for applying DFT-S-OFDM. The signal input to the transform precoders 330 are converted by Equation 2.

$$x_{dft}(n) = \frac{1}{\sqrt{M}} \sum_{i=0}^{M-1} X(i) \cdot e^{-j2\pi in/M}, n = 0, \ldots (M-1) \quad \text{[Equation 2]}$$

Here, X(i) denotes an output symbol of the layer mapper 320, and $x_{dft}(n)$ denotes an output signal of the transform precoders 330 of FIG. 3. In Equation 2, M denotes a size of the DFT precoder performing DFT precoding.

The output signals of the transform precoders 330 are input to the precoder 340 according to a transmission mode. The pre-coded symbols are input to the resource element mappers 350 corresponding to respective antenna ports according to the number of antenna ports 380. The resource element mappers 350 maps the pre-coded symbol to resource elements on time and frequency resources according to uplink scheduling information from the base station. The signals mapped to the corresponding resource elements by the resource element mappers 350 are input to the SC-FDMA signal generators 360, which convert the input signals to SC-FDMA signals, which pass through a DAC and an RF unit and then are transmitted by the antenna.

Figure 4:
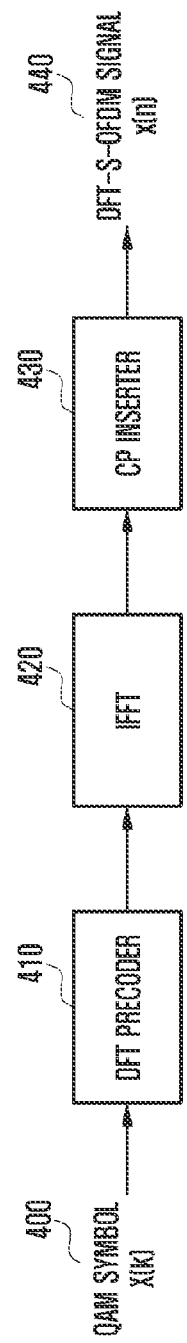
FIG. 4 is a block diagram illustrating a configuration of a DFT-S-OFDM signal generator for generating a DFT-S-OFDM signal being considered as a waveform for uplink in the legacy LTE system and 5G communication system.

FIG. 4 is a block diagram illustrating a configuration of a DFT-S-OFDM signal generator for generating a DFT-S-OFDM signal being considered as a waveform for uplink in the legacy LTE system and 5G communication system.

As shown in FIG. 4, the DFT-S-OFDM signal generator includes a DFT precoder 410, an IFFT 420, and a CP inserter 430. The DFT precoder 410 performs a DFT operation on the input symbol X(k) 400. The DFT precoding may be performed by Equation 2. In FIG. 4, the DFT precoder 410 is a component identical in function with the transform precoder 330. The output signal of the DFT precoder 410 is input to the IFFT 420, which performs inverse Fourier transform on input signal. Typically, the IFFT 420 has a size of $2^N$ (N is a natural number greater than 1). The size of the IFFT 420 is greater than M (M is the size of the output signal $x_{dft}(n)$ of the DFT precoder 410), $2^N$-M inputs of the $2^N$ inputs to the IFFT 420 are filled with "0" values. The IFFT operation may be implemented with Equation 1.

The CP inserter 430 inserts a CP to the IFFT'ed time domain signals to generate signals robust to a multipath channel. A length of the CP is determined according to a delay spread of the multipath channel experienced by a terminal. The CP-inserted signal x(n) 440 may pass through a DAC and an RF module and then be transmitted to the base station via an antenna.

Typically, the DFT-S-OFDM signal generated as described with reference to FIG. 4 has a drawback of a low data rate in comparison with that of the OFDM-based signal. However, the DFT-S-OFDM signal generation method guarantees a low peak-to-average-power-ratio (PAPR) because it uses an additional DFT precoder unlike the OFDM-based signal generation method. For this reason, the DFT-S-OFDM signal is advantageous in terms of having an uplink coverage larger than that of the OFDM signal.

In summary, the OFDM is capable of providing terminals located within a micro cell or around the cell center of a macro cell with a high uplink data rate. Meanwhile, the DFT-S-OFDM is capable of providing terminals located at an edge of the macro cell or having a poor SINR with a relatively large coverage.

Because the OFDM and the DFT-S-OFDM are complementary to each other in view of uplink data rate and coverage, it is considered to employ both the two waveforms in the 5G communication system. In order to accomplish this goal, the 5G communication system standardization is progressed in a way of allowing a transmitter of a terminal to support both uplink OFDM and DFT-S-OFDM signal transmissions and implementing a base station to support any or both of the OFDM and DFT-S-OFDM signal transmissions selectively. There is therefore a need of a method for the base station to configure whether to use the OFDM and/DFT-S-OFDM to a specific terminal or all terminals located within a cell for communication and/or a method for a terminal to autonomously determine a waveform to be used for uplink transmission.

The present invention proposes a method for configuring a waveform for use in communication to a terminal in a 5G communication system supporting two waveforms in uplink as described above. In detail, the present invention proposes a method for a base station configure a specific waveform to a terminal and a method for the terminal to estimate the waveform autonomously for use in uplink transmission for situations where the terminal is supposed to transmit an uplink signal in an initial access procedure and as scheduled in the state of being connected to a base station. The present invention also proposes an uplink transmission operation of a terminal to accomplish the above methods.

Embodiment 1-1

Embodiment 1-1 of the present invention is directed to a method for determining a waveform to be used by a terminal in an initial access procedure.

Figure 5:
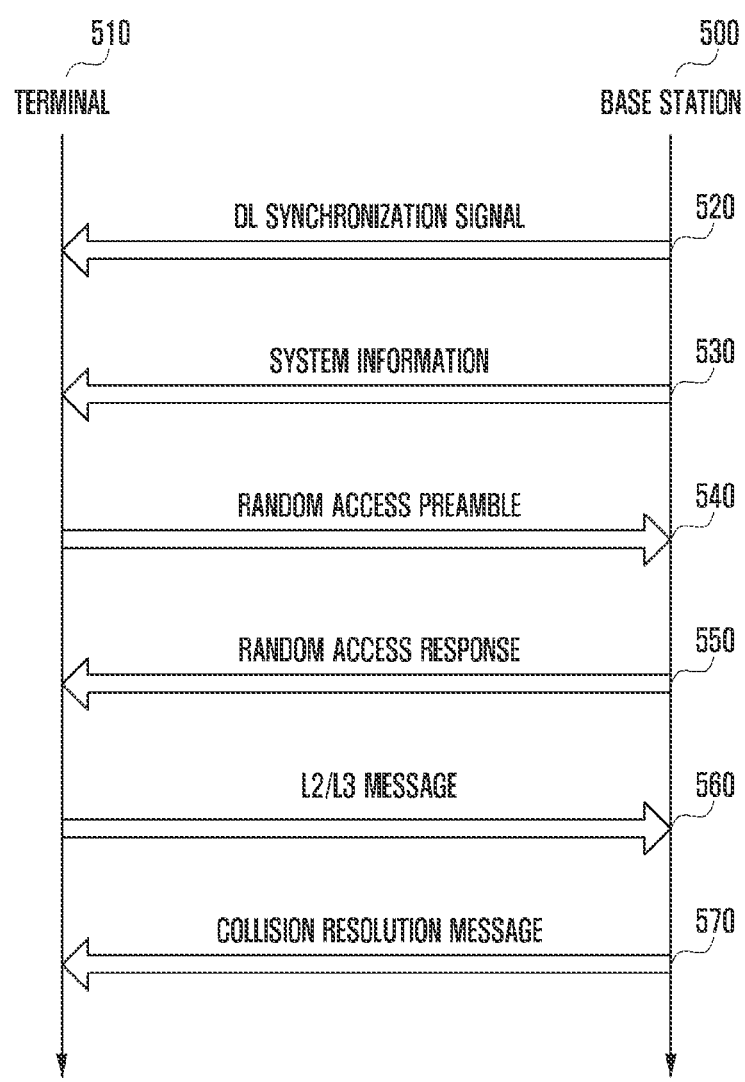
FIG. 5 is a signal flow diagram illustrating a random access procedure between a terminal and a base station in a legacy LTE system to help explain a random access being considered in the present invention.

FIG. 5 is a signal flow diagram illustrating a random access procedure between a terminal and a base station in a legacy LTE system to help explain a random access being considered in the present invention.

In FIG. 5, the base station 500 transmits a synchronization signal and system information, as denoted by reference numbers 520 and 530, in order for the terminal 510 in the idle or connected state within a cell to achieve synchronization and obtain system information. The system information 530 may be transmitted via a physical broadcast channel (PBCH) or a physical downlink shared channel (PDSCH) configured for system information transmission.

The terminal 510 achieves time and frequency synchronizations with the base station and ascertain a cell number (cell identity) based on the synchronization signal 520 transmitted by the base station 500. The synchronization signal may include a primary synchronization signal (PSS) and a second synchronization signal (SSS) in use for the LTE system or be a combination of them with an extra synchronization signal. The system information 530 may be used to transmit system information necessary for use in accessing the base station and its cell. Examples of the system information may include information necessary for use in random access of the terminal.

After receiving the synchronization signal 520 and the system information, the terminal 510 may transmit a random access preamble as denoted by reference number 540. In the legacy LTE system, the terminal 510 may transmit the random access preamble 540 based on time and frequency transmission resource information for transmitting the random access preamble 540 that is acquired from the system information 530. The random access preamble-transmission time and frequency resources are allocated at a predetermined interval and, if it is determined to transmit a random access preamble, the terminal may transmit the preamble on the random access preamble transmission resources appearing after the determination. The base station 500 attempts to detect random access preambles transmitted by the terminals on the random access preamble transmission resources it has configured. Typically, the random access preamble may be identified by time, frequency, and code; in the LTE system, it is possible to identify a terminal by a terminal-specific code sequence.

If the base station 500 detects a random access preamble including a specific code sequence, it transmits to the corresponding terminal, at step 550, a random access response in response to the preamble. The terminal 510 which has transmitted the random access preamble attempts to receive the random access response at step 550 during a predetermined time period after transmitting the random access preamble. The random access response received at step 550 may include resource allocation information, uplink timing control information, and uplink power control information for use by the terminal that has transmitted the random access preamble to transmit uplink data.

Upon receipt of the random access response, the terminal 550 may transmit layer2 and/or layer3 message information to the base station, at step 550, according to the uplink resource allocation information included in the random access response. Here, the terminal may transmit the Layer2/Layer3 message 560 via a physical uplink shared channel (PUSCH). The terminal may use the information acquired from the random access response 550 for transmitting the Layer2/Layer3 message information 560 to the base station.

Upon receipt of the Layer2/Layer3 message 560, the base station may transmit, at step 570, a collision resolution message in reply. The collision resolution message is transmitted for resolving a collision that may occur in the random access procedure. That is, in the case where multiple terminals transmit random access preambles with the same code sequence at step 540, they transmit the Layer2/Layer3 message on the same uplink resources, which causes a collision. Accordingly, the collision resolution message being transmitted at step 570 is scrambled with a unique identifier included in the properly received Layer2/Layer3 message among the Layer2/Layer3 messages transmitted by the multiple terminals such that only the terminal selected by the base station receives the collision resolution message.

The random access procedure depicted in FIG. 5 may be identically used in the 5G communication system. In the random access procedure depicted in FIG. 5, the terminal has to transmit the uplink L2/L3 message upon receipt of the random access response. The waveform for use in uplink signal transmission of the terminal before the receipt of configuration information on a new waveform as a consequence of the random access procedure with the base station after the receipt of the random access response is determined as follows.

The first method is for the terminal that has received a random access response in the initial access procedure to always use a DFT-S-OFDM-based waveform. That is, this may be expressed that the terminal uses DFT precoding in addition to the OFDM-based waveform. The DFT-S-OFDM or DFT precoding-based OFDM may be applied to both the physical uplink control channel (PUCCH) and PUSCH being transmitted from the terminal the base station.

Because the base station has no channel status information or reference signal received power (RSRP) or reference signal received quality (RSRQ) information reported by the terminal in the initial access procedure, it cannot determine a waveform suitable for the corresponding terminal. Accordingly, it may be preferred to use the DFT-S-OFDM (or DFT precoding-based OFDM) for transmitting PUSCH and PUCCH in consideration of the worst situation of the terminal in the initial access procedure as in the first method. It may not inevitable to use OFDM in the initial access procedure during which the terminal needs not use a high data rate for uplink data transmission to access to the base station. The terminal has to use the DFT-S-OFDM-based waveform for PUSCH and PUCCH transmission before receiving new waveform configuration information via radio resource control (RRC) connection setup.

The first method is advantageous in that the base station needs not transmit an additional signal notifying the terminal of a waveform to be used and disadvantageous in that the base station should have a receiver that is always capable of receiving DFT-S-OFDM signals. In order to provide a degree of freedom for base station implementation, it may be possible to consider following methods.

The second method is for the base station to notify the terminal located within a cell of the waveform to be used in the initial access procedure via system information. The base station may also notify the terminal whether to apply DFT precoding in addition to use of the OFDM-based waveform for transmitting PUSCH and PUCCH in the initial access procedure. Similar to the LTE system, the 5G communication system may be designed to configure multiple system information according to their importance and acquisition order. The system information is conveyed in a master information block that is supposed to be received after the terminal achieves synchronization with the base station and completes a cell search and in multiple system information blocks that are supposed to be received subsequently.

The base station may notify the terminal of the waveform for use in PUSCH and PUCCH transmissions using a 1-bit field included in the master information block. The base station may also notify the terminals located within the cell whether DFT precoding is necessary in addition to the use of the OFDM-based waveform for transmitting PUSCH and PUCCH using a 1-bit field included in the master information block. In order to make the above configuration, the master information block may include a field indicating the waveforms for the PUCCH and PUSCH in common or two fields indicating the waveforms for the PUCCH and PUSCH respectively. For example, the waveform information field of the master information block may be set to 0 for indicating no application of DFT precoding and 1 for indicating application of DFT precoding to transmit PUSCH.

The base station may notify the terminal located within the cell of the waveform to be used using a 1-bit field included in a system information block. The base station may also notify the terminal located within the cell whether to use the DFT precoding in addition to the OFDM waveform using a 1-bit field. It may be possible to use 1 bit to indicate the waveform to be used for PUSCH and PUCCH in common or 2 bits to indicate respective waveforms to be used for PUSCH and PUCCH. The corresponding information may be included in the system information block associated with random access among multiple system information blocks. For example, in the system information block, the waveform information field is set to 0 to instruct the terminal to transmit PUSCH without application of DFT precoding and 1 to instruct the terminal to transmit PUSCH with application of DFT precoding.

If the waveform for use in uplink transmission during the initial access procedure is configured to the terminal, the terminal has to transmit uplink signals with the waveform configured by the second method until a new terminal-specific waveform is configured via an RRC connection setup. If whether to perform DFT precoding on the uplink signal to be transmitted in the initial access procedure is configured to the terminal by the second method, terminal may apply the DFT precoding or not as configured by the second method until a new terminal-specific waveform is configured via an RRC connection setup.

The second method gives a high degree of freedom for the base station to configure the uplink waveform of the terminal and apply the DFT precoding in comparison with the first method. However the second method is not proper for the case where the terminals have different coverages or different requirements because a common waveform is configured to the terminals located in the cell. In order to overcome this problem, it may be possible to consider a third method that allows configuring the waveform for use in uplink transmission or whether to use DFT precoding in the initial access procedure per terminal.

The third method is for the base station to notify the terminal located within a cell of the waveform to be used via a random access response being transmitted in the case where the terminal transmits PUSCH in uplink to the base station in the initial access procedure. In the case where the terminal transmits the PUSCH in uplink to the base station in the initial access procedure, the base station may configure whether to use the DFT precoding to the terminal via the random access response. As described above, the random access response includes resource allocation information (e.g., modulation and coding scheme and time and frequency resources size) and a power control mode for uplink signal transmission from the terminal to the base station. It may also be possible to indicate the waveform for use by the terminal in uplink signal transmission using 1 bit. It may also be possible to indicate whether to use the DFT precoding using 1 bit. The waveform field may consist of 1 bit and the wave information field may, by way of example, be set to 0 for indicating use of OFDM and 1 for use of DFT-S-OFDM.

The fourth method is for the terminal to infer the waveform to be used from the resource allocation information included in the random access response instead of adding a field indicating the uplink waveform in the random access response as in the third method.

In the fourth method, the terminal infers the waveform for use in a PUSCH transmission from the resource allocation information in the case where the base station notifies all terminals located within the cell that it supports both the two waveforms via the system information; as a first approach, it may be proposed to associate the waveform with the MCS assigned to the terminal. If the terminal is located at a cell edge where the SINR is too low to secure coverage, it is preferred to use a low MCS. If the terminal is located around the center of the cell or the cell is small, it is preferred to transmit uplink signals using a high MCS. The terminal is capable of inferring the waveform to be used from the MCS as resource allocation information included in the random access response. The terminal may also infer whether the DFT precoding is applicable to the OFDM-based waveform from the MCS as the resource allocation information included in the random access response. Table 1 is an MCS table that is used in the LTE system. In the fourth method of embodiment 1-1 of the present invention, it is also proposed to preconfigure to use the DFT-S-OFDM or the OFDM according to the MCS index in the 5G communication system. It is also proposed to predefine whether to apply the DFT precoding to the OFDM-based waveform on not according to the MCS index. For example, it may be possible to preconfigure such that the MCS indices 0 to 4 are indicative of using the DFT-S-OFDM (or applying the DFT precoding) and the MCS indices 5 or greater indicative of using OFDM (or not applying the DFT precoding) in Table 1.

The present invention may also propose a method for the base station to transmit configuration information indicating MCS index-specific waveforms to the terminals commonly within the cell using a system information block. It may also be possible to propose a method to transmit configuration information indicating whether to applying or not DFT precoding in association with the MCS index to the terminals commonly within the cell. If the waveform is associated with the MCS index, the terminal may determine the waveform according to the MCS assigned via the random access response. For example, if the base station configures to use different waveforms based on the index 6 as the reference point (or if the base station configures to determine whether to use DFT precoding or not based on the index 6 as the reference point), the terminal may infer the use of the DFT-S-OFDM (applying the DFT precoding to OFDM-based waveform) for uplink transmissions from the MCS indices 0 to 6 and the use of the OFDM (using the OFDM without applying the DFT precoding) for uplink transmission from the remaining MCS indices.

TABLE 1

| MCS Index | Modulation Order | TBS Index | Redundancy Version |
|---|---|---|---|
| 0 | 2 | 0 | 0 |
| 1 | 2 | 1 | 0 |
| 2 | 2 | 2 | 0 |
| 3 | 2 | 3 | 0 |
| 4 | 2 | 4 | 0 |
| 5 | 2 | 5 | 0 |
| 6 | 2 | 6 | 0 |
| 7 | 2 | 7 | 0 |
| 8 | 2 | 8 | 0 |
| 9 | 2 | 9 | 0 |
| 10 | 2 | 10 | 0 |
| 11 | 4 | 10 | 0 |
| 12 | 4 | 11 | 0 |
| 13 | 4 | 12 | 0 |
| 14 | 4 | 13 | 0 |
| 15 | 4 | 14 | 0 |
| 16 | 4 | 15 | 0 |
| 17 | 4 | 16 | 0 |
| 18 | 4 | 17 | 0 |
| 19 | 4 | 18 | 0 |
| 20 | 4 | 19 | 0 |
| 21 | 6 | 19 | 0 |
| 22 | 6 | 20 | 0 |
| 23 | 6 | 21 | 0 |
| 24 | 6 | 22 | 0 |
| 25 | 6 | 23 | 0 |
| 26 | 6 | 24 | 0 |
| 27 | 6 | 25 | 0 |
| 28 | 6 | 26 | 0 |
| 29 | reserved | | 1 |
| 30 | | | 2 |
| 31 | | | 3 |

As the second approach for the terminal to infer the waveform for use in PUSCH transmission from the resource allocation information, it may be proposed to associate the waveform with the size of allocated frequency resources. That is, the terminal may determine whether to apply DFT precoding to uplink PUSCH transmission based on the size of the allocated frequency resources. If the terminal is located at the cell edge where SINR is too low to secure coverage for uplink PUSCH transmission, it is preferred for the terminal to perform the PUSCH transmission with small frequency resources from the viewpoint of coverage. In this case, it may be possible to configure to use OFDM for the case of being allocated resource blocks (RBs) equal to or greater than a specific number ($N_{RB}$) and DFT-S-OFDM for the case of being allocated RBs equal to or less than a specific number. Here, the resource block allocation size $N_{RB}$ for use in determining the waveform may be a value pre-agreed between the terminal and the base station or a value configured by the base station.

The third and fourth methods according to embodiment 1-1 of the present invention are considered only for the case of transmitting a PUSCH in the initial access procedure. However, in the case where a PUCCH transmission is required in the initial access procedure, it may also be possible for the terminal to perform the PUCCH transmission with the same waveform as the PUSCH transmission waveform that is determined according to the random access response.

The third and fourth methods according to embodiment 1-1 of the present invention are directed to the methods for the terminal to infer the waveform for use in PUSCH transmission from the random access response or the resource allocation information transmitted by the base station. In the case of determining the waveform based on the random access response, the terminal may interpret other fields of the random access response differently according to the determined waveform as follows.

In the legacy LTE system, the random access response includes a hopping flag field. This field indicates whether PUSCH frequency hopping is enabled. The DFT-S-OFDM-based LTE uplink transmission is restricted in that interleaved or comb type subcarrier mapping is not allowed for generating a low PAPR signal, which means that it is difficult to obtain frequency diversity gain. Accordingly, in order to achieve the frequency diversity gain without compromising the low PAPR signal characteristic, the frequency hopping is used, which is indicated by the random access response being transmitted in the initial access procedure. However, considering that the interleaved or comb type subcarrier mapping scheme is typically more effective than the frequency hopping scheme for achieving frequency diversity gain and that the OFDM imposes no requirements for generating a low PAPR signal, it may be possible to reuse the hopping flag field for indicating whether to use the continuous or localized resource allocation or interleaved-type resource allocation.

That is, if it is determined for the terminal to use the DFT-S-OFDM for uplink transmission according to any of the first to fourth methods, the terminal regards the hopping flag field as a field indicating whether to enable DFT-S-OFDM-based PUSCH hopping. The corresponding field may be set to 0 for disabling the PUSCH frequency hopping and 1 for enabling the PUSCH frequency hopping. If it is determined for the terminal to use the OFDM for uplink transmission according to any of the first to fourth embodiments, the terminal may determine whether to perform continuous resource allocation or interleaved-type resource allocation in the frequency domain based on the hopping flag field.

According to an embodiment of the present invention, if the terminal transmits a random access preamble and receives a random access response in the initial access procedure, the terminal may infer a waveform configuration method or a waveform to be used for an uplink PUSCH transmission by the terminal in accordance with the first to fourth methods. The uplink transmission waveform configuration method may be maintained until an RRC connection setup is completed by transmitting an uplink signal after receipt of the random access response. If an additional waveform is not configured for uplink transmission of the terminal even after the RRC connection setup has been completed, the terminal may continue using the uplink waveform used in the initial access procedure for uplink transmission. If a separate waveform for PUCCH transmission is configured or whether to apply DFT precoding is not configured, it may be assumed that the terminal can perform the PUCCH transmission using the same waveform as that for PUSCH transmission.

Embodiment 1-2

Embodiment 1-2 of the present invention is directed to a method for a terminal to determine a waveform for use in PUSCH and PUCCH transmissions in the stated of being connected to a base station after completing an RRC connection setup.

The first method is for a base station to configure a waveform for use by the terminal in uplink transmission during an RRC connection setup procedure. That is, the base station may configure whether to use an OFDM-based waveform or a DFT-S-OFDM-based waveform for PUSCH and PUCCH transmissions afterward via RRC signaling. The base station may also configure whether to apply DFT precoding to the OFDM-based waveform for PUSCH and PUCCH transmissions of the terminal via RRC signaling. Before a specific waveform is newly configured through the above method, the terminal may transmit uplink signals based on the previously configured waveform. If whether to apply the DFT precoding is configured, the terminal may transmit uplink signals based on the previously configured waveform until a new configuration is received.

The size of the scheduling information for PUSCH resource allocation to the terminal varies with waveform-specific resource allocation information and multiantenna transmission scheme. The terminal may perform a blind detection on downlink control signal channels to detect scheduling information allocating PUSCH resources to the terminal in consideration of waveform-specific scheduling information sizes.

The first method has a drawback of not coping promptly with a situation where the terminal enters a high-mobility state or the channel condition varies quickly because the PUSCH and PUCCH waveform is configured in a semi-static manner. Hereinafter, descriptions are made of the second and third methods for configuring an uplink waveform via a downlink control channel information for uplink scheduling.

The second method is for a base station to transmit scheduling information for scheduling uplink transmission of a terminal via downlink control information (DCI) conveyed by a physical downlink control channel (PDCCH). Here, the base station may notify the terminal of the waveform to be used via the DCI for scheduling PUSCH transmission. It may also be possible to notify whether to apply DFT precoding for PUSCH transmission via DCI. For this purpose, a 1-bit field for indicating an uplink waveform may be included. The waveform field may consist of 1 bit and the waveform information field may, by way of example, be set to 0 for indicating use of OFDM and 1 for indicating use of DFT-S-OFDM. A 1-bit field for indicating whether to apply DFT precoding for uplink transmission may also be included.

The third method is for a terminal to infer the waveform to be used from uplink resource allocation information included in downlink control channel instead of adding a field indicating the uplink waveform to the downlink control channel for uplink scheduling as in the second method. In this case, the base station has to notify the terminal of simultaneous use of two waveforms via system information.

As the first approach for the terminal to infer the waveform for use in PUSCH transmission from the resource allocation information, it may be proposed to associate the waveform with the MCS assigned to the terminal. If the terminal is located at a cell edge where the SINR is too low to secure the coverage, it is preferred to use a low MCS. If the terminal is located around the center of the cell or the cell is small, it is preferred to transmit uplink signals using a high MCS. The terminal is capable of inferring the waveform to be used from the MCS as resource allocation information included in the random access response.

Table 1 is an MCS table that is used in the LTE system; in the fourth method of embodiment 1-2 of the present invention, it is also proposed to preconfigure to use the DFT-S-OFDM or the OFDM according to the MCS index in the 5G communication system. For example, it may be possible to preconfigure such that the MCS indices 0 to 4 are indicative of using the DFT-S-OFDM and the MCS indices 5 or greater are indicative of using the OFDM. It may also be possible to propose a method to transmit configuration information indicating whether to applying or not DFT precoding in association with the MCS index to the terminals commonly within the cell. For example, if the base station configures to use different waveforms based on the index 6 as the reference point, the terminal may infer the use of the DFT-S-OFDM for uplink transmissions from the MCS indices 0 to 6 and the use of the OFDM for uplink transmission from the remaining MCS indices.

As the second approach for the terminal to infer the waveform for use in PUSCH transmission from the resource allocation information, it may be proposed to associate the waveform with the size of allocated frequency resources. If the terminal is located at the cell edge where SINR is too low to secure coverage for uplink PUSCH transmission, it is preferred for the terminal to perform the PUSCH transmission with small frequency resources from the viewpoint of coverage. In this case, it may be possible to configure to use OFDM for the case of being allocated resource blocks (RBs) equal to or greater than a specific number ($N_{RB}$) and DFT-S-OFDM for the case of being allocated RBs equal to or less than a specific number. Here, the resource block allocation size $N_{RB}$ for use in determining the waveform may be a value pre-agreed between the terminal and the base station or a value configured by the base station.

In the second and third methods according to embodiment 1-2 of the present invention in which the waveform to be used is determined based on the downlink control channel information, although the number of bits required in the DCI varies with the waveform, it is necessary to fix the number of bits. In the case where the OFDM-based uplink scheduling information requires $N_{OFDM}$ bits while the DFT-S-OFDM-based uplink scheduling information requires $N_{DFT-S-OFDM}$ bits and $N_{DFT-S-OFDM}$ is greater than $N_{DFT-S-OFDM}$, it may be possible to pad the OFDM-based uplink scheduling information with $N_{OFDM}$-$N_{DFT-S-OFDM}$ 0s.

The second and fourth methods according to embodiment 1-2 of the present invention are directed to the method for the base station to configure a waveform for use in uplink signal transmission of the terminal using the downlink control channel information for PUSCH scheduling or for the terminal to infer the wave form from the resource allocation information. In the case of determining the waveform as above, the terminal may interpret other fields of the downlink control channel information differently according to the determined waveform as follows.

In the legacy LTE system, the downlink control information for uplink scheduling includes a hopping flag field. This field indicates whether PUSCH frequency hopping is enabled. The DFT-S-OFDM-based LTE uplink transmission is restricted in that interleaved or comb type subcarrier mapping is not allowed for generating a low PAPR signal, which means that it is difficult to obtain frequency diversity gain. Accordingly, in order to achieve the frequency diversity gain without compromising the low PAPR signal characteristic, the frequency hopping is used, which is indicated by DCI. However, considering that the interleaved or comb type subcarrier mapping scheme is typically more effective than the frequency hopping scheme for achieving frequency diversity gain and that the OFDM imposes no requirements for generating a low PAPR signal, it may be possible to reuse the hopping flag field for indicating whether to use the continuous or localized resource allocation or interleaved-type resource allocation.

That is, if it is determined for the terminal to use the DFT-S-OFDM for uplink transmission according to any of the first to fourth methods, the terminal regards the hopping flag field as a field indicating whether to enable DFT-S-OFDM-based PUSCH hopping. The corresponding field may be set to 0 for disabling the PUSCH frequency hopping and 1 for enabling the PUSCH frequency hopping. If it is determined for the terminal to use the OFDM for uplink transmission according to any of the first to fourth embodiments, the terminal may determine whether to perform continuous resource allocation or interleaved-type resource allocation in the frequency domain based on the hopping flag field.

The base station may also include information on the waveform for use by a terminal in transmitting PUCCH carrying acknowledgement/negative-acknowledgement (ACK/NACK) information corresponding to PDSCH in the DCI for PDSCH scheduling. In this case, the DCI for PDSCH scheduling may include a field indicating a waveform for use in PUCCH transmission. This field may be set to 1 to instruct the terminal to use OFDM-based waveform for PUCCH transmission or 0 to instruct the terminal to use SC-FDMA-based waveform for PUCCH transmission.

Figure 6:
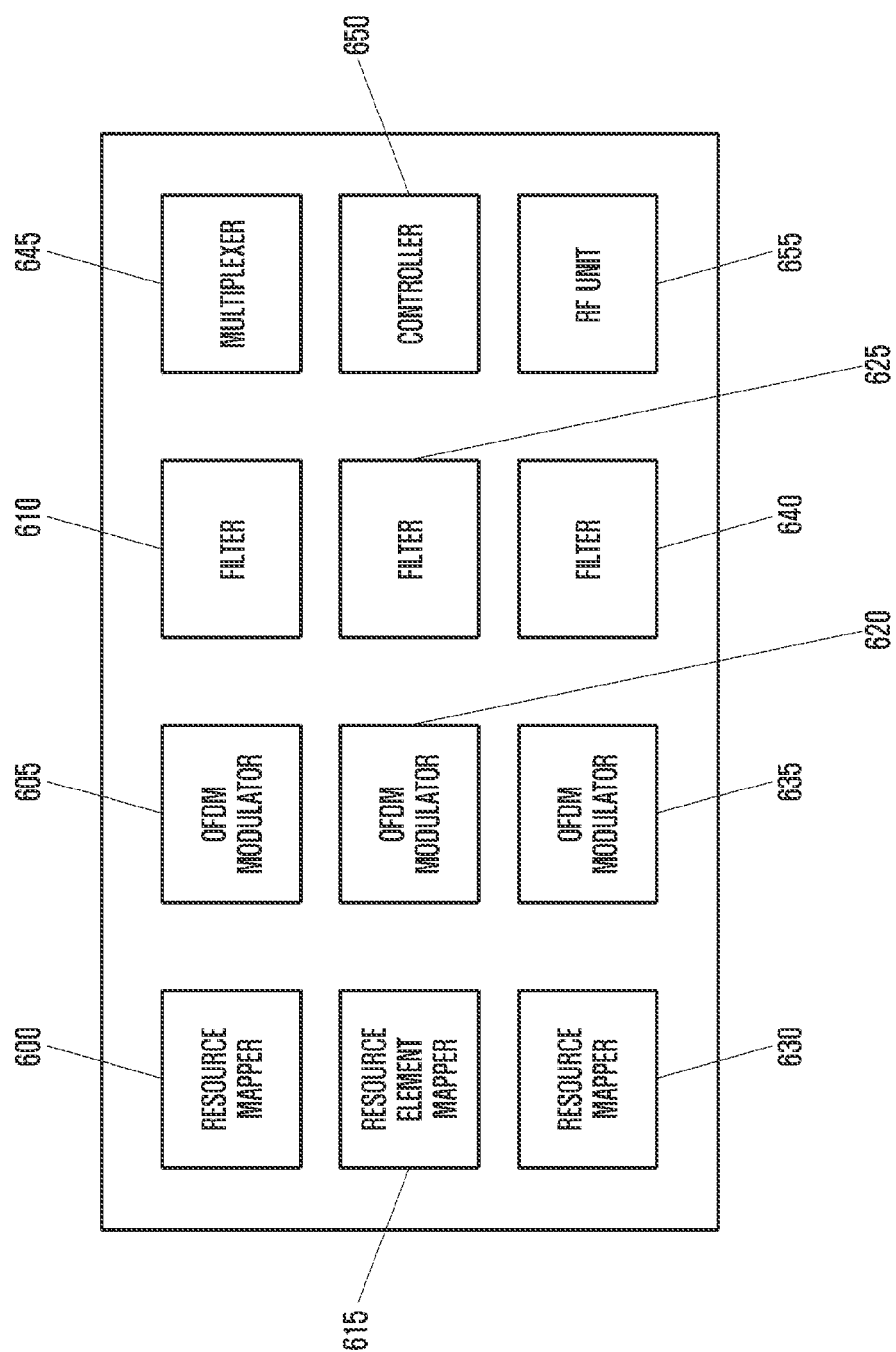
FIG. 6 is a block diagram illustrating a configuration of the transmitter of the base station according to an embodiment of the present invention.
Figure 7:
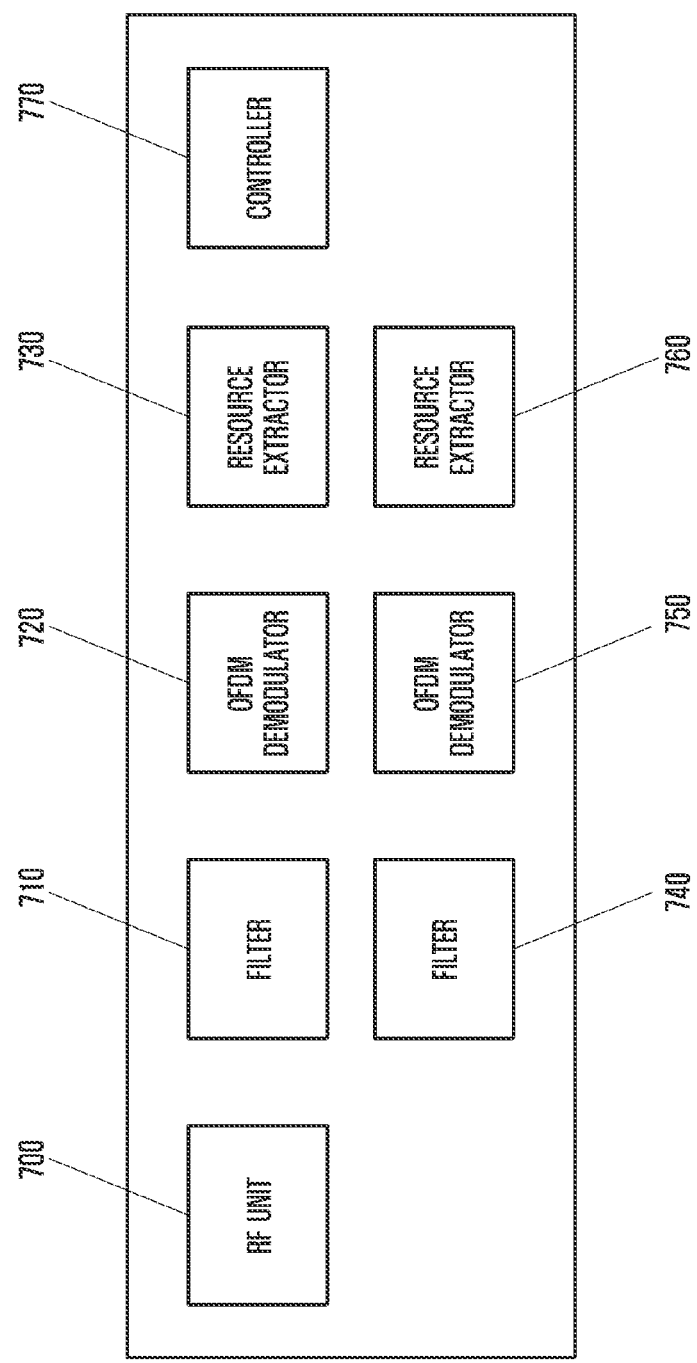
FIG. 7 is a block diagram illustrating a configuration of the receiver of the terminal according to an embodiment of the present invention.

FIGS. 6 and 7 depicts a transmitter of a base station and a receiver of a terminal for implementing the above embodiments. The transmitter of the base station and the receiver of the terminal should operate according to the initial access method and apparatus of the 5G communication system proposed in embodiment 1-1 and 1-2.

FIG. 6 is a block diagram illustrating a configuration of the transmitter of the base station according to an embodiment of the present invention.

As shown in FIG. 6, the transmitter of the base station of the present invention includes resource mappers 600, 615, and 630, OFDM modulators 605, 620, and 635, and filters 610, 625, and 640. The resource mappers 600, 615, and 630 perform QPSK or QAM modulation on data to be transmitted and map the modulated data to time and frequency domain resources. The OFDM modulators 605, 620, and 635 perform OFDM modulation on the resource-mapped signal output from the resource mappers 600, 615, and 630. The OFDM modulation includes performing IFFT and inserting a CP at the beginning of the OFDM symbols. The filters 610, 625, and 640 filter the signals output from the OFDM modulators 605, 620, and 635 to meet frequency band spectrum mask requirements.

The service data are processed by the resource mappers, OFDM modulators, and filters assigned in an service-specific manner to generate physical channels and signals. For example, in order to transmit a physical channel and signal for an eMBB service, the resource mapper 600, OFDM modulator 605, and filter 610 assigned for the eMBB transmission operate to generate the physical channel and signal corresponding to the eMBB service. Here, the resource mapper 600, OFDM modulator 605, and filter 610 may generate the physical channel and signal based on a numerology defined for the eMBB service.

Similarly, common signals including signals for achieving synchronization and acquiring system information may be processed via the resource mapper 630, OFDM modulator 635, and filter 640 assigned for the common signals to generate a physical channel and signal corresponding to the common signals. Here, the common signals may be generated based on a numerology defined for the common signals. The resource mapper 630 may freely configure frequency location for transmitting the common signals unlike in the legacy LTE system.

The transmitter of the base station includes a multiplexer 645 for multiplexing outputs from the respective filters. The transmitter of the base station includes a controller 650 for controlling the resource mappers 600, 615, and 630, and the OFDM modulator 605, 620, and 635, the filters 610, 625, and 640, and the multiplexer 645 to operate efficiently. Finally, the transmitter of the base station includes an RF unit 655 and an antenna for transmitting the services that are mutually multiplexed by the multiplexer 645 to respective terminals.

FIG. 7 is a block diagram illustrating a configuration of the receiver of the terminal according to an embodiment of the present invention. The receiver of the terminal includes an antenna, an RF unit 700, filters 710 and 740, OFDM demodulators 720 and 750, resource extractors 730 and 760, and a controller 770. In order to support services being provided with two or more different numerologies, multiple filters 710 and 740, OFDM modulators 720 and 750, and resource extractors 730 and 760; FIG. 7 depicts an exemplary case of supporting two different services.

In detail, the receiver of the terminal converts a received signal from passband to baseband by means of the RF unit 700. The converted baseband signal is input to the filter 710 and 740. It may be possible to turn on/off the filters and change numerologies of the filters depending on the service subscribed by the terminal. Here, the filters are used to remove interferences caused by the signals frequency-division-multiplexed (FDM'ed) in adjacent frequency regions. The OFDM demodulators 720 and 750 are used for performing OFDM modulation on the filtered signal. The OFDM demodulator 720 and 750 may each include a CP remover and an FFT. The resource extractors 730 and 760 may extract the physical channels and signals on the resources occupied by the respective services. The controller 770 may control a series of processes in order for the terminal to operate according to the above-described embodiments of the present invention.

Although preferred embodiments of the invention have been described using specific terms, the specification and drawings are to be regarded in an illustrative rather than a restrictive sense in order to help understand the present invention. It is obvious to those skilled in the art that various modifications and changes can be made thereto without departing from the broader spirit and scope of the invention. If necessary, the embodiments may be combined in whole or in part. For example, embodiments 1-1 and 1-2 of the present invention may be combined in part to form an embodiment for the operations of a base station and a terminal.

Embodiment 2

Meanwhile, a 5G new radio access technology (NR) is designed to allow for freely multiplexing various types of services onto time and frequency resources and assigning waveforms/numerologies and reference signals dynamically or freely to meet service-specific requirements. For wireless communications in which great importance is given to the channel quality and interference measurement for providing terminals with optimal services, correct channel state measurement is inevitable. Unlike the 4G communication in which the channel and interference characteristics rarely vary with the frequency resources, the 5G communication is characterized in that the channel and interference characteristics significantly vary with services, which makes it necessary to support subsets of a frequency resource group (FRG) for separate measurements thereof. Meanwhile, the services being supported in the NR system are categorized into three categories: enhanced mobile broadband (eMBB), massive machine type communications (mMTC), and ultra-reliable and low-latency communications (URLLC). The eMBB services are characterized by high capacity and high mobility communication, the mMTC services by low power consumption and massive connections, and the URLLC by ultra-high reliability and low latency. The requirements may vary with the type of services to be provided to the terminal.

In order for the communication system to provide users with various types of services, there is a need of a method and apparatus for multiplexing different services into the same time period to meet the service-specific requirements.

The mobile communication system has evolved to a high-speed, high-quality packet data communication system (such as High Speed Packet Access (HSPA), LTE (or evolved universal terrestrial radio access (E-UTRA)), and LTE-Advanced (LTE-A) defined in the $3^d$ Generation Partnership Project (3GPP), High Rate Packet Data (HRPD) defined in the $3^{rd}$ Generation Partnership Project-2 (3GPP2), Ultra Mobile Broadband (UMB), and 802.16e defined in the IEEE)) capable of providing data and multimedia services beyond the early voice-oriented services. Meanwhile, 5G or NR standardization is in progress for 5G wireless communication systems.

The LTE system as one of the representative broadband wireless communication systems uses orthogonal frequency division multiplexing (OFDM) in the downlink (DL) and single carrier frequency division multiple access (SC-FDMA) in the uplink (UL). The term "uplink" denotes a radio link for transmitting data or control signals from a terminal that is interchangeably referred to as user equipment (UE) and mobile station (MS) to a base station (BS) that is interchangeably referred to as evolved node B (eNB), and the term "downlink" denotes a radio link for transmitting data or control signals from a base station to a terminal. Such multiple access schemes are characterized by allocating the time-frequency resources for transmitting user-specific data and control information without being overlapped with each other, i.e., maintaining orthogonality, so as to distinguish among user-specific data and control information.

The LTE system adopts a Hybrid Automatic Repeat Request (HARQ) scheme for physical layer retransmission when decoding failure occurs in initial data transmission. An HARQ scheme is designed to operate in such a way that a receiver, when it fails in decoding data, sends a transmitter a negative acknowledgement (NACK) indicative of the decoding failure in order for the transmitter to retransmit the corresponding data on the physical layer. The receiver combines the retransmitted data with the decoding-failed data to improve data reception performance. The HARQ scheme may also be designed to operate in such a way that the receiver, when it succeeds in decoding data, sends the transmitter an Acknowledgement (ACK) indicative of successful decoding in order for the transmitter to transmit new data.

Figure 8:
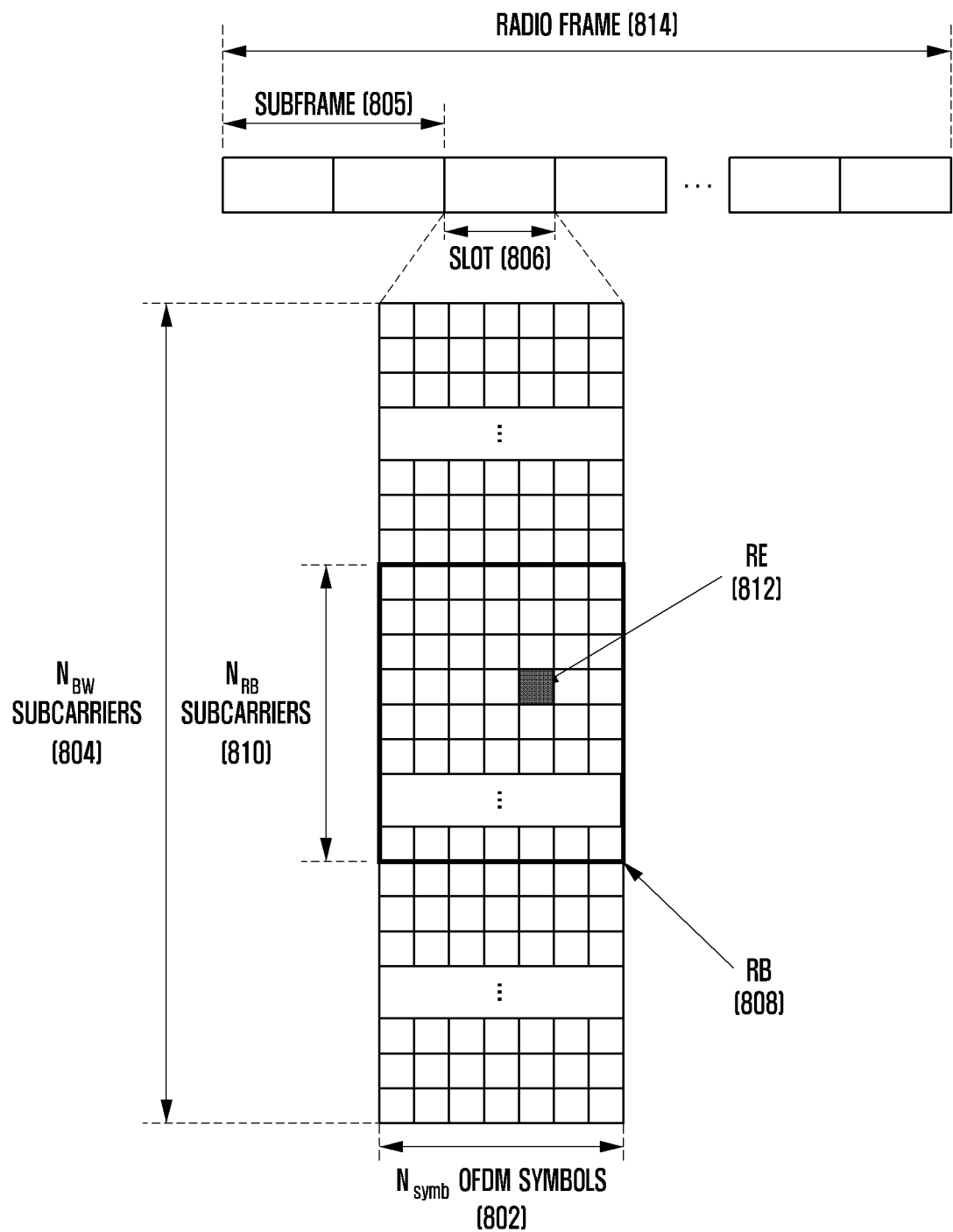
FIG. 8 is a diagram illustrating a basic time-frequency resource structure for transmitting downlink data or control channels in an LTE system.

FIG. 8 is a diagram illustrating a basic time-frequency resource structure for transmitting downlink data or control channels in an LTE system.

In FIG. 1, the horizontal axis denotes the time, and the vertical axis denotes the frequency. The smallest transmission unit in the time domain is an OFDM symbol, and $N_{symb}$ OFDM symbols 802 form a slot 806, and 2 slots form a subframe 805. Each slot spans 0.5 ms, and each subframe spans 1.0 ms. A radio frame 814 is a time unit consisting of 10 subframes. In the frequency domain, the smallest transmission unit is a subcarrier, and the total system transmission bandwidth consists of $N_{BW}$ subcarriers 804.

In the time-frequency resource structure, the basic resource unit is a Resource Element (RE) 812 indicated by an OFDM symbol index and a subcarrier index. A Resource Block (RB) (or Physical Resource Block (PRB)) 808 is defined by $N_{symb}$ consecutive OFDM symbols 802 in the time domain and $N_{RB}$ consecutive subcarriers 810 in the frequency domain. That is, one RB 808 consists of $N_{symb} \times N_{RB}$ REs 812. Typically, the RB is the smallest data transmission unit. In the LTE system, $N_{symb}=7$, $N_{RB}=12$, and $N_{BW}$ is proportional to the system transmission bandwidth; a non-LTE system may use different values. The data rate increases in proportion to the number of RBs scheduled to the terminal.

For the LTE system, 6 transmission bandwidths are defined. In the case of an FDD system in which downlink and uplink are separated in frequency, the downlink transmission bandwidth and uplink transmission bandwidth may differ from each other. The channel bandwidth denotes an RF bandwidth in comparison with the system transmission bandwidth. Table 2 shows the relationship between the system transmission bandwidth and channel bandwidth defined in the LTE system. For example, an LTE system having a 10 MHz channel bandwidth uses the transmission bandwidth of 50 RBs.

TABLE 2

| Channel bandwidth $BW_{Channel}$ [MHz] | 1.4 | 3 | 5 | 10 | 15 | 20 |
|---|---|---|---|---|---|---|
| Transmission bandwidth configuration $N_{RB}$ | 6 | 15 | 25 | 50 | 75 | 100 |

The downlink control information is transmitted in N OFDM symbols at the beginning of the subframe. Typically, N={1, 2, 3}. Accordingly, N value varies, at every subframe, with the control information amount to be transmitted. The control information includes a control channel transmission period indicator for indicating a number of OFDM symbols for conveying the control information, scheduling information for downlink or uplink data transmission, and an HARQ ACK/NACK signal.

In the LTE system, the downlink or uplink data scheduling information is transmitted from the base station to the terminal using Downlink Control Information (DCI). The DCI is categorized into different DCI formats depending on the purpose, e.g., indicating UL grant for UL data scheduling or DL grant for DL data scheduling, indicating usage for control information that is small in size, indicating whether multiple antenna-based spatial multiplexing is applied, and indicating usage for power control. For example, the DCI format 1 for DL grant is configured to include at least the following information.

Resource allocation type 0/1 flag: Resource allocation type 0/1 flag indicates whether the resource allocation scheme is Type 0 or Type 1. A Type-0 is to allocate resources in units of Resource Block Group (RBG) by applying a bitmap scheme. In the LTE system, the basic unit of scheduling may be a Resource Block (RB) that is expressed by time-frequency domain resources, and the RBG may include multiple RBs and may be the basic unit of scheduling in the Type-0 scheme. A Type-1 is to allocate a particular RB in an RBG.

Resource block assignment: Resource block assignment indicates an RB allocated for data transmission. The resources may be determined depending on the system bandwidth and the resource allocation scheme.

Modulation and coding scheme (MCS): MCS indicates a modulation scheme used for data transmission and a size of a transport block to be transmitted.

HARQ process number: HARQ process number indicates a process number of HARQ.

New data indicator: New data indicator indicates whether the HARQ transmission is an initial transmission or a retransmission.

Redundancy version: Redundancy version indicates a redundancy version of HARQ.

TPC command for PUCCH: Transmit Power Control (TPC) command for Physical Uplink Control Channel (PUCCH) indicates a power control command for a PUCCH that is an uplink control channel.

The DCI may be transmitted over a Physical Downlink Control Channel (PDCCH) or Enhanced PDCCH (EPDCCH) after undergoing a channel coding and modulation process. In the following description, the phrase PDCCH or EPDCCH transmission/reception may be interchangeably used with DCI transmission/reception.

Typically, the DCI may undergo channel coding for each terminal independently, and then the channel-coded DCI may be configured with its dependent PDCCH and transmitted. In the time domain, a PDCCH may be mapped and transmitted during the control channel transmission period. The frequency-domain mapping location of the PDCCH may be determined by an ID of each terminal, and it may be spread throughout the entire system transmission band.

Downlink data may be transmitted over a Physical Downlink Shared Channel (PDSCH) that is a physical channel for downlink data transmission. A PDSCH may be transmitted after the control channel transmission period, and the scheduling information such as the detailed mapping location in the frequency domain and the modulation scheme may be indicated by the DCI that is transmitted over the PDCCH.

Using MCS as part of the control information constituting the DCI, the base station notifies the terminal of the modulation scheme applied to the PDSCH to be transmitted and the size of data (e.g., Transport Block Size (TBS)) to be transmitted. In an embodiment, the MCS has a bitwidth of 5 or less than or greater than 5. The TBS corresponds to the size given before channel coding for error correction is applied to the data (e.g., Transport Block (TB)) to be transmitted by the base station.

The modulation schemes supported by the LTE system may include Quadrature Phase Shift Keying (QPSK), 16 Quadrature Amplitude Modulation (QAM), and 64QAM, and they have modulation orders ($Q_m$) 2, 4, and 6, respectively. That is, the QPSK modulation transmits 2 bits per symbol, the 16QAM transmits 4 bits per symbol, and the 64QAM transmits 6 bits per symbol. It may also be possible to use 256QAM or higher order modulation depending on the system.

Figure 9:
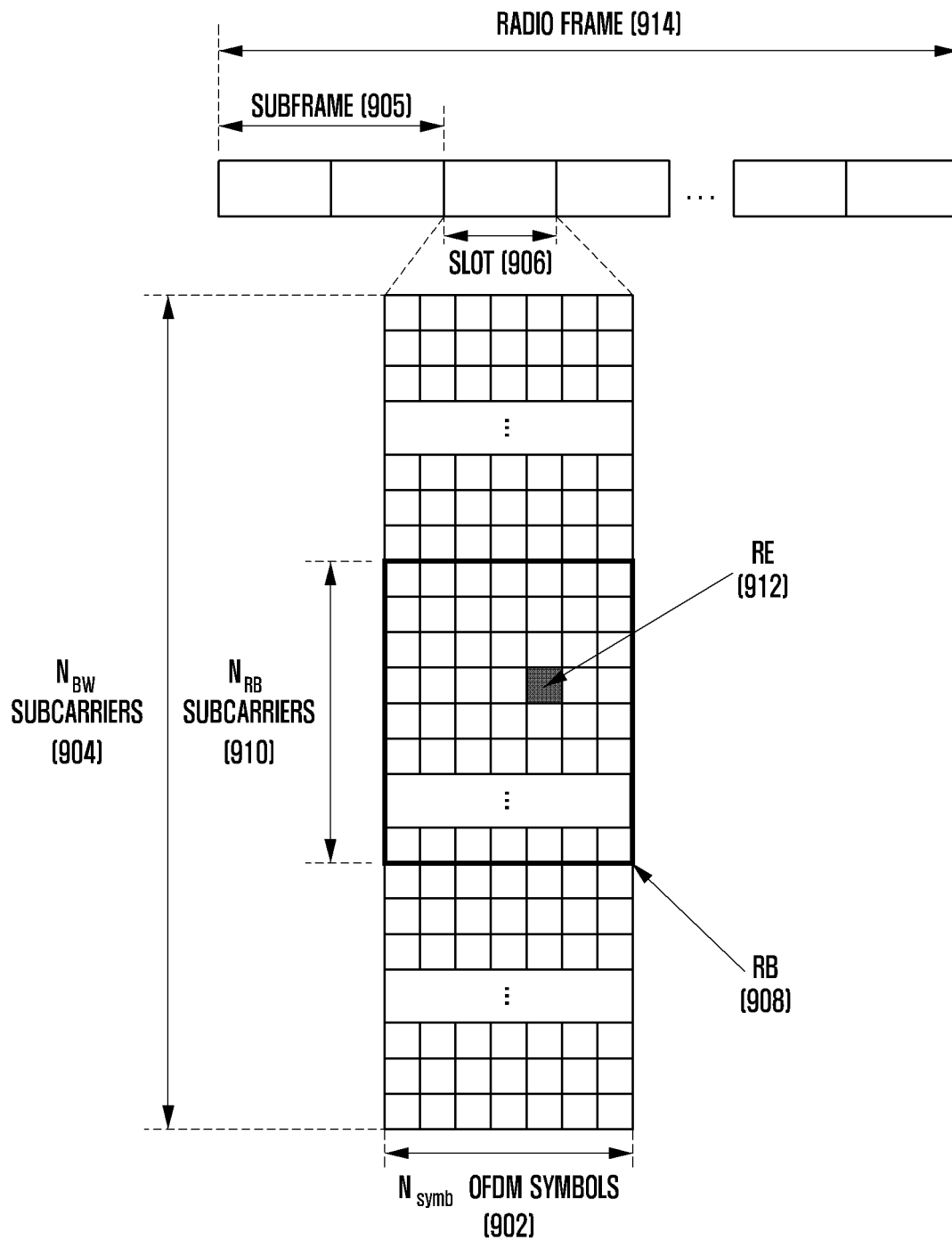
FIG. 9 is a diagram illustrating a basic time-frequency resource structure for transmitting uplink data or control channels in an LTE-A system.

FIG. 9 is a diagram illustrating a basic time-frequency resource structure for transmitting uplink data or control channels in an LTE-A system.

In FIG. 9, the horizontal axis denotes the time, and the vertical axis denotes the frequency. The smallest transmission unit in the time domain is an SC-FDMA symbol, and $N_{symb}$ SC-FDMA symbols 902 form a slot 906. Two slots form a subframe 905. The smallest transmission unit in the frequency domain is a subcarrier, and the total system transmission bandwidth consists of $N_{BW}$ subcarriers 904. $N_{BW}$ may be proportional with the system transmission bandwidth.

In the time-frequency domain, the basic resource unit is RE 912, and each RE is defined by one SC-FDMA symbol index and one subcarrier index. A resource block (RB) 908 is defined by $N_{symb}$ consecutive SC-FDMA symbols in the time domain and $N_{RB}$ consecutive subcarriers in the frequency domain. Accordingly, one RB consists of $N_{symb} \times N_{RB}$ REs. Typically, the smallest data or control information transmission unit is RB. A physical uplink control channel (PUCCH) is mapped to a frequency region corresponding to one RB and transmitted during a time period of one subframe.

The LTE standard defines a relationship between the PDSCH or the PDCCH/EPDCCH carrying a semi-persistent scheduling (SPS) release and the PUCCH or physical uplink shared channel (PUSCH) carrying the HARQ ACK/NACK corresponding to the PDSCH, PDCCH, or EPDCCH. For example, in an LTE system operating in the FDD mode, the HARQ ACK/NACK corresponding to the PDSCH or the PDCCH or EPDCCH carrying the SPS release, the PDSCH or the PDCCH or EPDCCH being transmitted at the $(n-4)^{th}$ subframe, is carried in the PUCCH or PUSCH being transmitted at the $n^{th}$ subframe.

The LTE system employs an asynchronous HARQ scheme for DL HARQ. That is, if an eNB receives an HARQ NACK for initially transmitted data from a UE, it may freely determine a retransmission timing through a scheduling operation. If the UE fails to decode the received data, it stores the erroneous initial data and combines the buffered data with the retransmitted data.

If the UE receives a PDSCH carrying the DL data transmitted by the eNB at the $n^{th}$ subframe, it transmits UL control information including the HARQ ACK/NACK corresponding to the DL data to the eNB through the PUCCH or PUSCH at the $(n+k)^{th}$ subframe. Here, k is determined differently depending on the duplex mode (i.e., FDD or time division duplex (TDD)) and subframe configuration in use by the LTE system. For example, k is fixed to 4 in the FDD LTE system. Meanwhile, k may vary according to the subframe configuration and subframe index in the TDD LTE system.

The LTE system employs a synchronous HARQ scheme with a fixed data transmission timing for UL transmission distinct from the DL HARQ. That is, the UL-DL timing relationship between the PUSCH and PDCCH that is followed by the PUSCH and a physical hybrid indicator channel (PHICH) carrying the DL HARQ ACK/NACK corresponding to the PUSCH is fixed according to a rule as follows.

If the UE receives a PDCCH carrying UL scheduling control information or a PHICH carrying a DL HARQ ACK/NACK from the eNB at the $n^{th}$ subframe, it transmits UL data through a PUSCH at the $(n+k)^{th}$ subframe based on the control information. Here, k is determined differently depending on the duplex mode in use, i.e., FDD or TDD, and its configuration. For example, k is fixed to 4 in the FDD LTE system. Meanwhile, k may vary according to the subframe configuration and subframe index in the TDD LTE system.

In the FDD LTE system, the eNB transmits a UL grant or a DL control signal and data to the UE at the $n^{th}$ subframe, the UE receives the UL grant or the DL control signal and data at the $n^{th}$ subframe. If the UE receives a UL grant at the $n^{th}$ subframe, it transmits uplink data at the $(n+4)^{th}$ subframe. If the UE receives a DL control signal and data at the $n^{th}$ subframe, it transmits an HARQ ACK/NACK corresponding to the DL data at the $(n+4)^{th}$ subframe. In this case, a time period given for the UE to prepare UL data transmission scheduled via the UL grant or transmission of HARQ ACK/NACK corresponding to the DL data becomes 3 ms, which is equal to the duration of three subframes.

The UE receives the PHICH carrying the DL HARQ ACK/NACK from the eNB at the $i^{th}$ subframe and the DL HARQ ACK/NACK corresponding to the PUSCH transmitted by the UE at the $(i+k)^{th}$ subframe. Here, k is determined differently depending of the duplex mode (i.e., FDD or TDD) and its configuration in use by the LTE system. For example, k is fixed to 4 in the FDD LTE system. Meanwhile, k may vary according to the subframe configuration and subframe index in the TDD LTE system.

Figure 10:
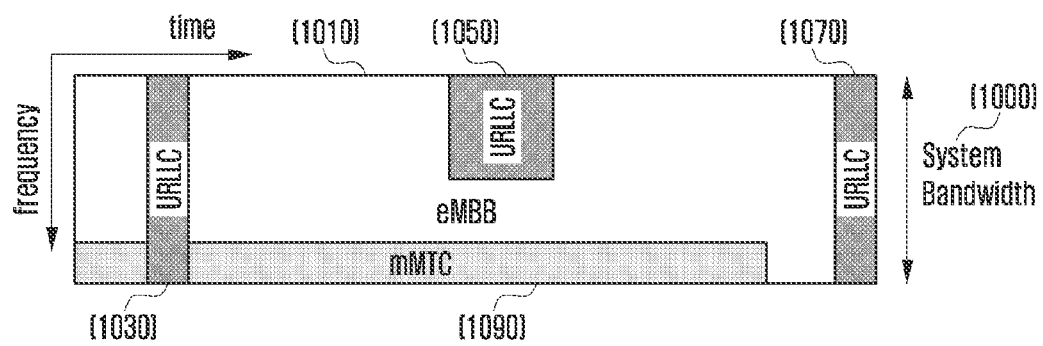
FIG. 10 is a diagram illustrating frequency-time resources allocated for transmitting data of eMBB, URLLC, and mMTC services in a communication system.
Figure 11:
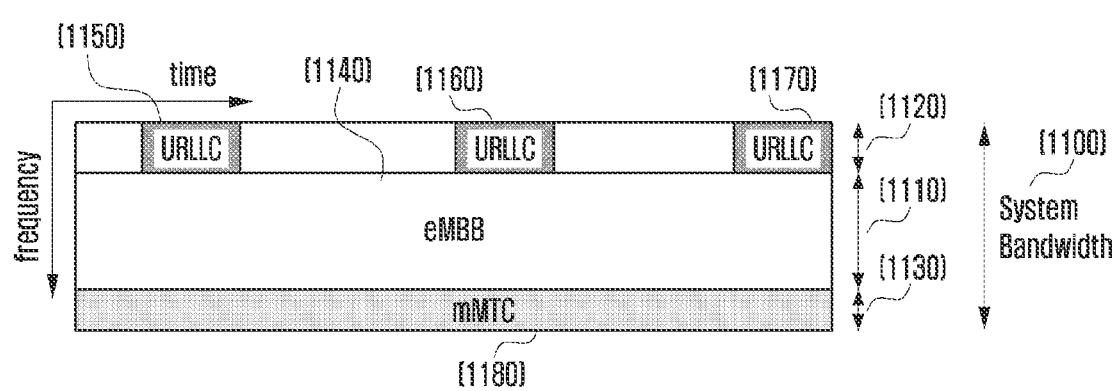
FIG. 11 is a diagram illustrating frequency-time resources allocated for transmitting data of eMBB, URLLC, and mMTC services in a communication system.

FIGS. 10 and 11 are diagrams illustrating frequency-time resources allocated for transmitting data of eMBB, URLLC, and mMTC services being considered in the 5G or NR system.

FIGS. 10 and 11 show how the frequency and time resources are allocated for information transmission in a system. In FIG. 10, the eMBB, URLLC, and mMTC data are allocated across the entire system frequency band 1000. If the URLLC data 1030, 1050, and 1070 are generated to be transmitted during the transmission of the eMBB 1010 and mMTC 1090 in specific frequency bands, parts of the eMBB 1010 and mMTC 1090 may be punctured such that the URLLC data 1030, 1050, and 1070 are inserted. Because the URLLC services are delay-sensitive among the aforementioned services, the URLLC data 1030, 1050, and 1070 may occupy parts of the resources allocated for eMBB data 1010. In the case of transmitting the URLLC data on the resources allocated for the eMBB data, the eMBB data may not transmitted on the overlapping frequency-time resources, which may degrade eMBB data transmission throughput. That is, in the above case, the resource allocation for the URLLC data transmission may cause eMBB data transmission failure.

In FIG. 11, the system frequency band 1100 is divided into sub-bands 1110, 1120, and 1130 for data transmissions of different services. The sub-band configuration information may be preconfigured and transmitted from a base station to a terminal by higher layer signaling. And the sub-band-related information provide the services without any arbitrarily separate transmission of sub-band configuration information to the terminal by base stations or network nodes. In FIG. 11, the sub-bands 1110, 1120, and 1130 are allocated for eMBB data transmission, URLLC data transmission, and mMTC data transmission, respectively.

Throughout the embodiment, the transmission time interval (TTI) for URLLC transmission may be shorter that the TTI for eMBB or mMTC transmission. The acknowledgement corresponding to the URLLC data may be transmitted more quickly than the acknowledgement corresponding to the eMBB or mMTC data, resulting in low latency information transmission/reception.

Figure 12:
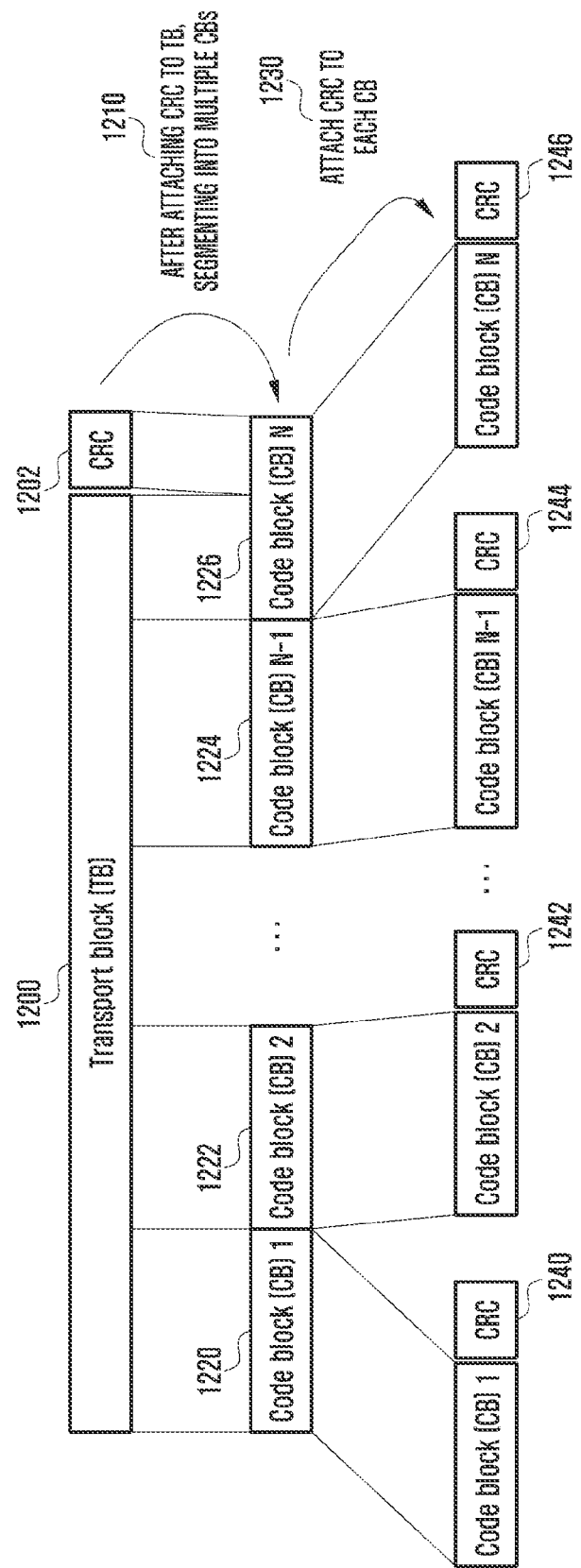
FIG. 12 is a diagram illustrating a procedure for segmenting a transport block into multiple code blocks and attaching a CRC to the code blocks.

FIG. 12 is a diagram illustrating a procedure for segmenting a transport block into multiple code blocks and attaching a CRC to the code blocks.

In reference to FIG. 12, a CRC 1202 may be attached at the beginning or end of a transport block (TB) 1200 to be transmitted in uplink or downlink. The CRC may have a fixed length of 16 bits or 24 bits or a variable length varying with channel condition and may be used for determining whether the channel coding is successful. A block including the TB 1200 and the CRC 1202 may be segmented into multiple code blocks (CBs) 1220, 1222, 1224, and 1226 as denoted by reference number 1210. Each CB has a predetermined maximum size as far as possible and, in this case, the last CB 1226 may be smaller in size than the other code blocks; it may be possible to add 0s, random values, or is to the last CB to make the last CB to be equal in length to other CBs.

It may be possible to add CRCs 1240, 1242, 1244, and 1246 to the respective CBs. The CRC may have a fixed length of 16 bits, 24 bits, or the like and may be used for determining whether the channel coding is successful. However, attaching the CRC 1202 to the TB and attaching the CRCs 1240, 1242, 1244, and 1246 to the respective CBs may be omitted depending on the type of the channel code to be applied to the CBs. For example, in the case of applying an LDPC code rather than a turbo code, attaching the CRCs 1240, 1242, 1244, and 1246 to the respective CBs may be omitted. However, even if the LDPC code is applied, the CRCs 1240, 1242, 1244, and 1246 may be attached to the CBs. Even in the case of using a polar code, it may be possible to omit attaching any CRC.

Figure 13:
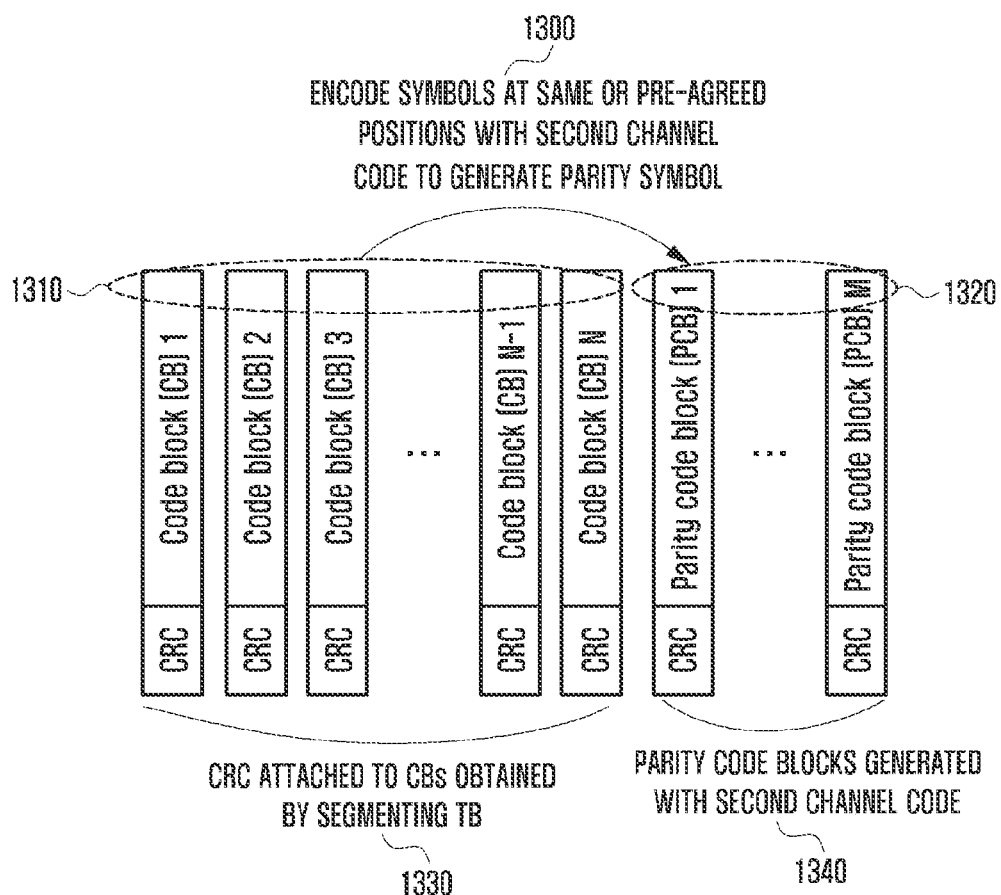
FIG. 13 is a diagram illustrating a coding structure to which an outer code is applied according to an embodiment of the present invention.
Figure 14:
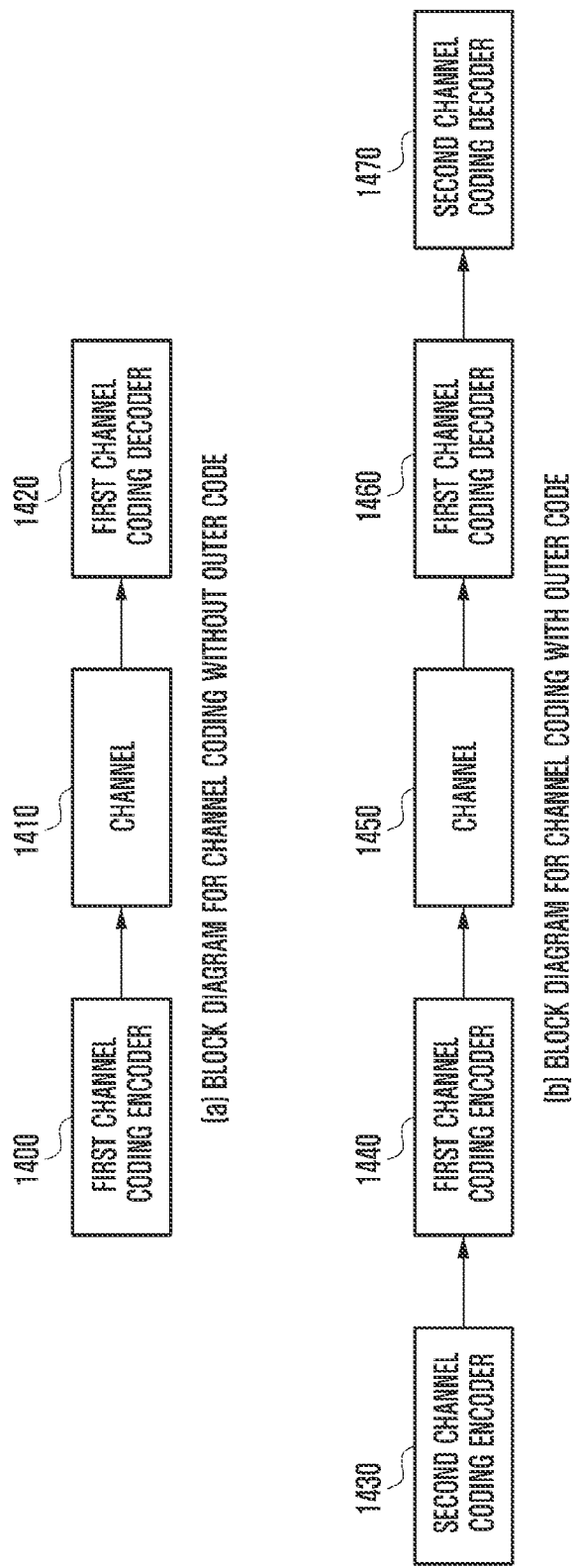
FIG. 14 is a block diagram illustrating channel coding processes with and without applying an outer coder according to an embodiment of the present invention.

FIG. 13 is a diagram illustrating an outer code-based transmission method, and FIG. 14 is a diagram illustrating a structure of an outer code-based communication system.

A description is made of the method for transmitting a signal with an outer coded with reference to FIGS. 13 and 14.

In FIG. 13, a TB is segmented into multiple CBs of which bits or symbols 1310 located at identical bit-positions are encoded with a second channel code to generate parity bits or symbols 1320 as denoted by reference number 1300. Next, CRCs 1330 and 1340 may be respectively attached to the CBs and parity CBs generated by encoding with the second channel code. It may be possible to attach the CRC or not depending on the type of the channel code. For example, if a turbo code is used as a first channel code, the CRCs 1330 and 1340 are attached and then the CBs and parity CBs may be encoded with the first channel code.

The TB is delivered from a higher layer to a physical layer. The physical layer regards the TB as data. A CRC is attached to the TB. The CRC may be generated with the TB and a cyclic generator polynomial, which may be defined in various manners. For example, assuming that the cyclic generator polynomial is $g_{CRC24A}(D)=D24+D23+D18+D17+D14+D11+D10+D7+D6+D5+D4+D3+D+1$ for a 24-bit CRC, if L=24, it may be possible to determine $a_0 D^{A+23}+a_1 D^{A+22}+ \ldots +a_{A-1}D^{24}+p_0 D^{23}+p_1 D^{22}+ \ldots +p_{22}D^1+p_{23}$ divisible by $g_{CRC24A}(D)$ with the remainder 0 as CRCs CRC $p_0, p_1, p_2, p_3, \ldots, p_{L-1}$. Although the description has been made to the case where the CRC length L is 24, L may be set to 12, 16, 24, 32, 40, 48, 64, or the like. A CRC is attached to the CBs and, in this case, the CRC may be generated with a cyclic generator polynomial different from that used in generating the CRC attached to the TB.

In the legacy LTE system, if an initial transmission fails, retransmission is performed in unit of TB. Unlike in the legacy LTE system, it may be considered to perform the retransmission by CB rather than TB. In order to accomplish this, it may be necessary for the terminal to transmit multi-bit HARQ-ACK feedback per TB. The base station may also provide information indicating parts to be retransmitted in the control information for scheduling the retransmission.

In reference to FIG. 14, in the case of using the outer code, the data to be transmitted passes the second channel coding encoder 1430. Examples of the channel coded for the second channel coding may include a Reed-Solomon code, a BCH code, a Raptor code, and a parity bit generation code. The bits or symbols that pass the second channel coding encoder 1430 pass a first channel coding encoder 1440. Examples of the channel code for the first channel coding may include a Convolutional code, an LDPC code, a Turbo code, and a Polar code. If the channel-coded symbols are received by a receiver over a channel 1450, the receiver may process the received signals by means of a first channel coding decoder 1460 and a second channel coding decoder 1470 in serial order. The first and second channel coding decoders 1460 and 1470 may perform opposite operations of the first and second coding encoders 1440 and 1430, respectively.

In the case of not using the outer code, only the first channel coding encoder 1400 and the first channel coding decoder 1420 are used in the channel coding block diagram with no second channel coding encoder and decoder. Even in the case of not using the outer code, the first channel coding decoder 1420 may have an identical configuration with that of the first channel coder 1440 for the case of using the outer coder.

In the following description, an eMBB service is referred to as first type service, and eMBB service data are referred to as first type data. The terms "first type service" and "first type data" are not limited to eMBB, and they may include other service types requiring a high speed data transmission or broadband transmission. Meanwhile, a URLLC service is referred to as second type service, and URLLC service data are referred to as second type data. The terms "second type service" and "second type data" are not limited to URLLC, and they may include other service types requiring low latency, high reliability transmission, or low latency and high reliability transmission. Meanwhile, an mMTC service is referred to as third type service, and mMTC service data are referred to as third type data. The terms "third type service" and "third type data" are not limited to mMTC, and they may include other service types requiring low speed, broad coverage, or low power transmission. In an embodiment, the first type service may be understood as including or not including the third type service.

The physical layer channel structures for transmitting the three types of services or data may differ from each other. For example, they may differ in at least one of TTI length, frequency resource allocation unit, control channel structure, and data mapping scheme.

Although three types of services and three types of data are enumerated above, the principle of the present invention can be applied to the cases were a larger number of service and data types exist.

In an embodiment, the terms "physical channel" and "signal" in use for LTE and LTE-A systems are used for explaining the proposed method and device. However, the principle of the present invention is applicable to other wireless communication systems as well as the LTE and LTE-A systems.

As described above, the present invention defines communication operations between a terminal and a base station for transmitting the first, second, and third type services or data and proposes a method for serving the terminals in such a way of scheduling the different types of services or data for the respective terminals in the same system. In the present invention, the terms "first type terminal", "second type terminal", and "third type terminal" are intended to indicate the terminals for which the first, second, and third types of services or data, respectively, are scheduled. In an embodiment, the first type terminal, second type terminal, and third type terminal may be identical with or different from each other.

Exemplary embodiments of the present invention are described in detail with reference to the accompanying drawings. Detailed descriptions of well-known functions and structures incorporated herein may be omitted to avoid obscuring the subject matter of the present invention. Further, the following terms are defined in consideration of the functionality in the present invention, and they may vary according to the intention of a user or an operator, usage, etc. Therefore, the definition should be made on the basis of the overall content of the present specification.

In the following description, the term "base station (BS)" denotes an entity for allocating resources to terminals and is intended to include at least one of a Node B, an evolved Node B (eNB), a radio access unit, a base station controller, and a network node. The term "terminal" is intended to include a user equipment (UE), a mobile station (MS), a cellular phone, a smartphone, a computer, and a multimedia system with a communication function. Although the description is directed to an LTE or LTE-A system by way of example, the present invention is applicable to other communication systems having a similar technical background and channel format. For example, the present invention is applicable to the 5G mobile communication technology (5G new radio (NR)) under development after LTE-A. It will be understood by those skilled in the art that the present invention can be applied even to other communication systems with a slight modification without departing from the spirit and scope of the present invention.

In the present invention, the TTI denotes a unit of time for transmitting control and data signals or only the data signal. In the legacy LTE system, by way of example, the TTI is equal in length to one subframe as a unit of time, i.e., 1 ms, in downlink. In the present invention, the TTI may denote a unit of time for transmitting a control and data signal or only the data signal in uplink. In the legacy LTE system, the TTI is a time unit of 1 ms equal in length to one subframe in both downlink and uplink.

Meanwhile, one of the important criteria determining the throughput of a wireless cellular communication system is packet data latency. LTE employs a TTI of 1 ms, which is identical with the length of one subframe. An LTE system employing a TTI of 1 ms may support a UE operating with a TTI shorter than 1 ms (short-TTI UE). Meanwhile, the 5G NR may employ a TTI shorter than 1 ms. The short-TTI UE is suitable for latency-sensitive services such as voice over LTE (VoLTE) and remote control services and is expected to be a means for realizing mission-critical IoT. It may also be expected that the short-TTI UE can be a means for realizing cellular-based mission-critical IoT.

In the present invention, the terms "physical channel" and "signal" in use for the LTE or LTE-A system may be interchangeably used with the terms "data" or "control signal". For example, although PDSCH is a physical channel carrying normal-TTI data, it may be referred to as normal-TTI data in the present invention.

Unless the TDD system is specified, the description is made under the assumption of the FDD system. However, the method and apparatus proposed in the present invention for use in the FDD system is applicable to the TTD system with slight modifications.

In the present invention, the term "higher layer signaling" denotes a signaling method for the base station to transmit a signal to the UE on a downlink data channel of the physical layer or for the UE to transmit a signal to the base station on an uplink data channel of the physical layer and may be referred to as RRC signaling or MAC control element (CE) signaling.

In the following description, the term "transmit end" may be used to indicate a base station in downlink and terminal in uplink. The term "receive end" may be used to indicate the terminal in downlink and the base station in uplink.

In the following description, the term "sub-TB" may be understood as a virtual concept indicating a bundle of one or more CBs.

Embodiment 2-1

Embodiment 2-1 is directed to a method for a terminal to report a maximum CB size to a base station.

After connecting to the base station, the terminal reports to the base station the maximum CB size that the terminal supports in transmitting data. The report may mean transmitting UE capability including the maximum CB size supported by the terminal (UE).

Embodiment 2-2

Embodiment 2-2 is directed to a method for configuring a maximum CB size for use in uplink or downlink data transmission to a terminal, which is described with reference to FIG. 15.

The base station transmits to the terminal the information on the maximum CB size for use in data transmission via higher layer signaling. Before receiving the maximum CB size information, the terminal may assume a value pre-agreed between the terminal and the base station as the maximum CB size. Once the maximum CB size information is received, the terminal may assume a value indicated by the maximum CB size information as the maximum CB size for use in data communication. The maximum CB size information may include a value for use in segmenting a TB into one or more CBs.

Figure 15:
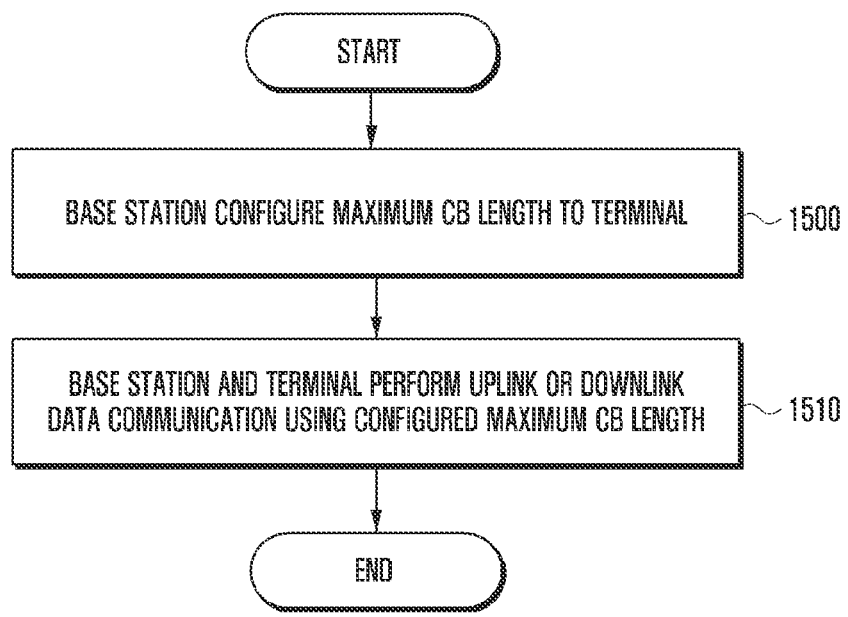
FIG. 15 is a flowchart illustrating a procedure for data communication using a maximum CB size configured between a base station and a terminal according to embodiment 2 of the present invention.

FIG. 15 is a flowchart illustrating a procedure for data communication using a maximum CB size between a base station and a terminal. The base station configure the maximum CB size to the terminal via higher layer signaling at step 1500. Although the description is made of the case where the maximum CB size information is transmitted from the base station to the terminal via higher layer signaling, the maximum CB size information may be transmitted, at step 1500, via DCI as a downlink control signal, a system information block (SIB), or a combination of the higher layer signaling and the DCI. In this embodiment, the maximum CB size may vary between uplink and downlink data transmissions.

At step 1510, the base station and the terminal may perform data communication using the configured maximum CB length. If a maximum CB length is used for data communication, this may mean that the transmitter segments a TB into one or more CBs based on the maximum CB length and that the receiver performs channel decoding with the CB length calculated based on the maximum CB length. The receiver may calculate a number of CBs and the length of each CB based on the maximum CB length upon receipt of one TB, perform channel decoding on the CBs with the calculated length, and perform, if a CRC exists at a predetermined position, a CRC test to determine whether the transmission is successful.

Embodiment 2-2-1

Embodiment 2-2-1 explains a method for a base station and an terminal to segmenting a TB into one or more CBs using a configured maximum size and adding a CRC in embodiment 2-2. Embodiment 2-2-1 is an example of embodiment 2, which may include various alternative examples.

In this embodiment, Z denotes a maximum CB size possible for one CB, and B denotes a size of a TB. In this embodiment, $L_{CB}$ denotes a length of a CRC being attached to a CB, and $L_{TB}$ denotes a length of a CRC being attached to a TB. In this embodiment, C denotes the number of CBs.

In this embodiment, the maximum CB size, denoted by Z, may be a value that the base station configures to the terminal. In this embodiment, $N_{CB}$ may be a value greater than 0, which is pre-agreed between the transmitter and the receiver, and indicate the CRC length of the CB. In the following description, $\lceil X \rceil$ denotes an integer greater than X and $\lfloor X \rfloor$ denotes the greatest integer less than X.

The total number of CBs, denoted by C, may be determined as follows.

--- if B ≤ Z,
 $L_{CB} = 0$
 Number of code blocks: C=1
 B' = B
else
 $L_{CB} = N_{CB}$ Number of code blocks: $C = \left\lceil \dfrac{B}{Z - L_{CD}} \right\rceil$ B' = B+C·$L_{CB}$
end if

---

In the above description, the CRC length per CB and the number of CBs are determined based on the configured maxim CB size Z and, as a consequence, the total number of bits of data to be transmitted is determined. Hereinafter, how to segment a TB into CBs is described. In the following description, cd denotes the $k^{th}$ bit of the $r^{th}$ CB.

The number of bits for each CB is calculated as follows.

---

First segment size: $K_+$ is the smallest value included in a specific set among K values satisfying
B'≤C·K (the specific set may be a set including values pre-agreed between the transmitter and the receiver).
if C=1
number of CBs with size $K_+$: $C_+$=1, $K_-$=0, $C_-$=0
else if C>1
Second segment size: $K_-$ is the largest value included in a specific set among K values satisfying
K<$K_+$ (the specific set may be a set including values pre-agreed between the transmitter and the
receiver).
$\Delta_K = K_+ - K_-$ number of CBs with size $K_-$: $C - \left\lfloor \dfrac{C \cdot K_+ - B'}{\Delta_k} \right\rfloor$ number of CBs with size $K_+$: C+ = C - $C_-$
end if
number of 0 NULL padding bits: F = $C_+ \cdot K_+ + C_- \cdot K_-$ - B'
for k = 0 to F-1
  $C_{0k}$ =<NULL>
end for
k = F
s = 0
for r = 0 to C-1
  if r < $C_-$
   $K_r = K_-$
  else
   $K_r = K_+$
  end if
  perform [STEP 1] below
end for
[STEP 1 start]
while k < $K_r - L_{CB}$
  $C_{rk} = b_s$
  k = k+1
  s = s+1
end while
if C > 1
calculate $L_{CB}$-bit CRC. Filler bit is regarded as 0.
  while k < $K_r$
   $C_{rk} - P_{r(k+LrkKr)}$; $p_{rk}$ denote bits of CRC
   k = k+1
  end while
end if
k = 0
[STEP 1 end]

Figure 18:
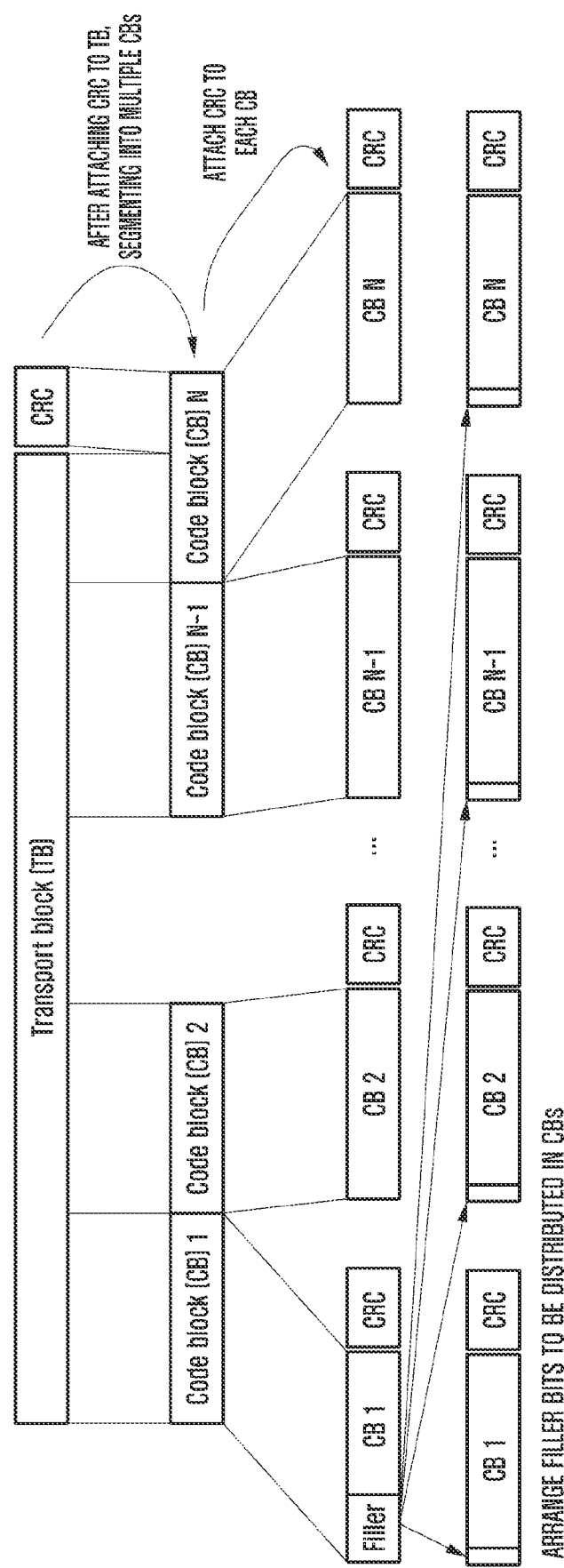
FIG. 18 is a diagram illustrating a structure of a TB that is segmented into CBs, to which filler bits are added at their beginnings, according to an embodiment of the present invention.
Figure 19:
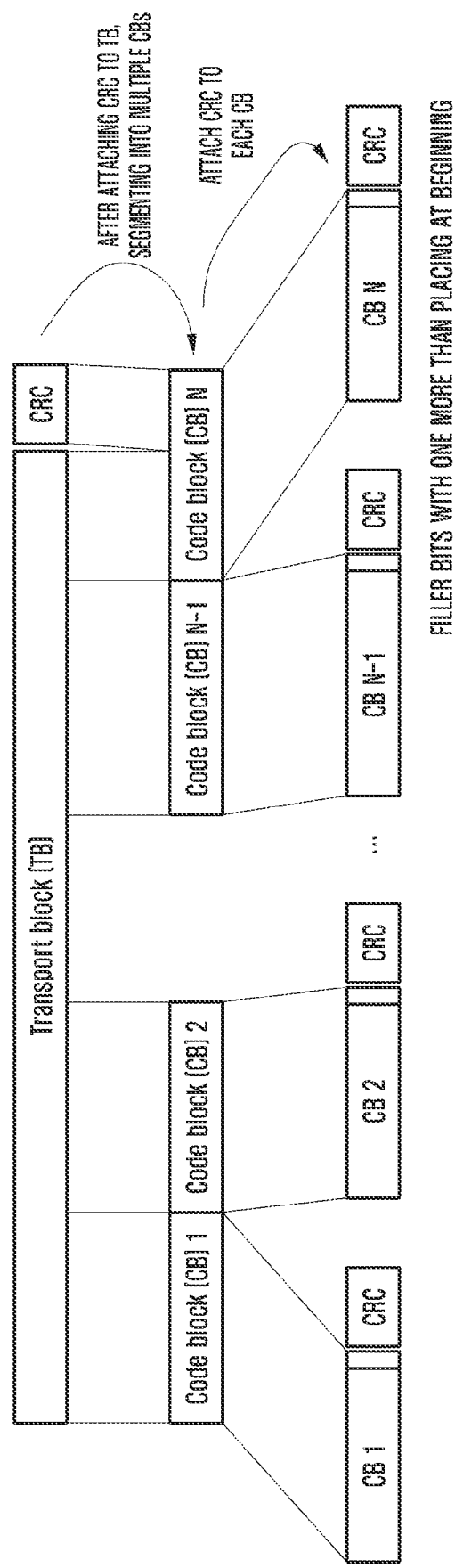
FIG. 19 is a diagram illustrating a structure of a TB that is segmented into CBs, to which filler bits are added at their ends, according to an embodiment of the present invention.

Although the zero or NULL padding bits are inserted at the beginning by way of example in the above embodiment, and it may be possible to insert the padding bits in the middle or at the end. It may also be possible to arrange the filler bits at the beginning or end of every CB in a distributed manner as shown in FIGS. 18 and 19.

Figure 16:
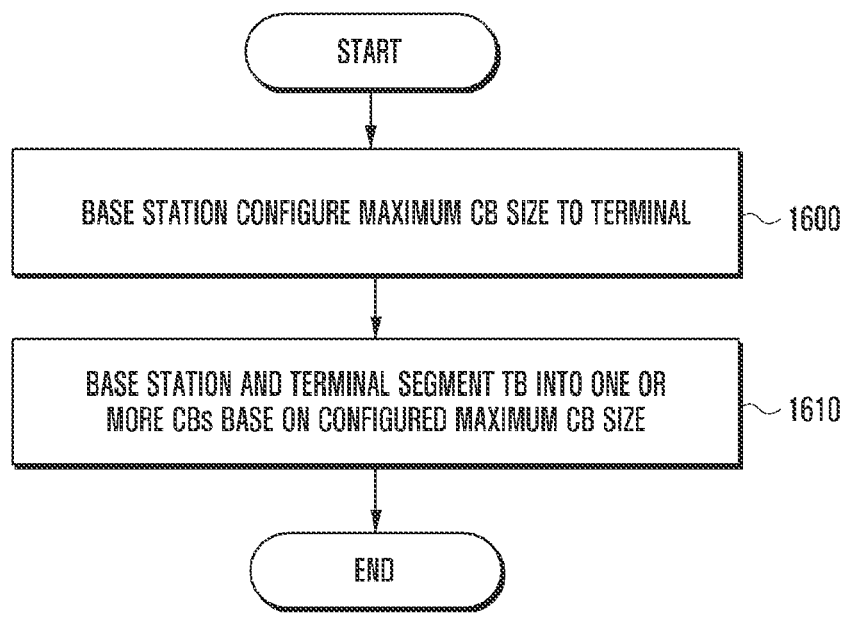
FIG. 16 is a flowchart illustrating an operation of a transmitter according to embodiment 2-1 of the present invention.

FIG. 16 is a flowchart illustrating an operation of a transmitter according to an embodiment of the present invention. The transmitter may configure a maximum CB size to a terminal at step 1600, segment a TB into one or more CBs based on the preconfigured maximum CB size Z and adds an CRC to the CB at step 1610.

Figure 17:
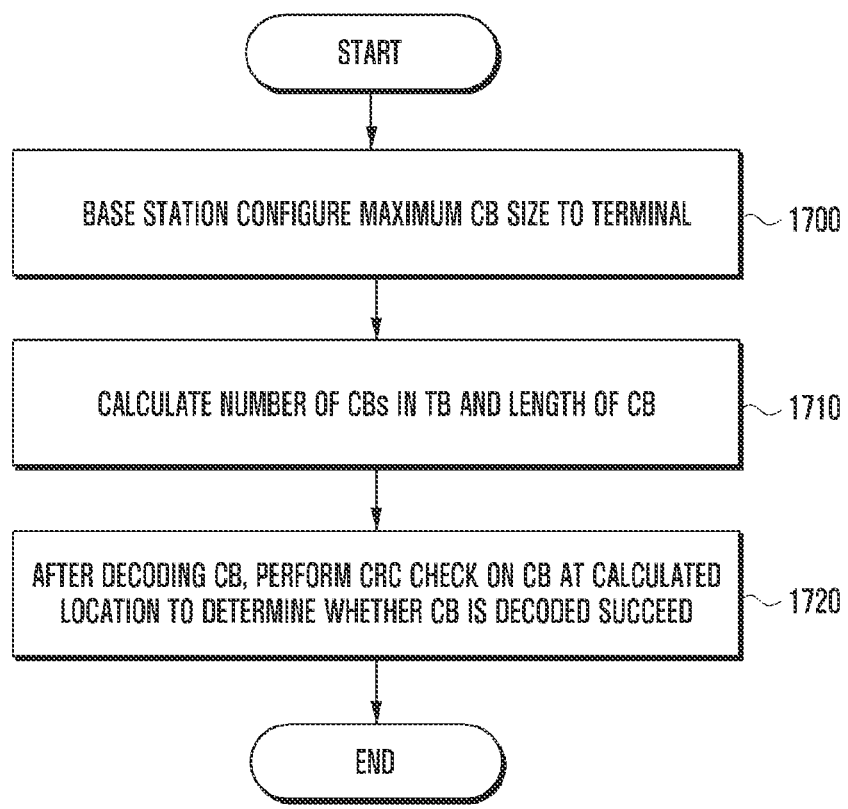
FIG. 17 is a flowchart illustrating an operation of a receiver according to embodiment 201 of the present invention.

FIG. 17 is a flowchart illustrating an operation of a receiver according to an embodiment of the present invention. The receiver, e.g., a terminal, may configure itself, at step 1700, with a maximum CB size received from a base station, discern one or more CBs based on the preconfigured maximum CB size Z at step 1710, and perform a CRC test after decoding the CB to determine whether the decoding is successful at step 1720.

Embodiment 2-2

Embodiment 2-2 is directed to a method for segmenting a TB into one or more CBs based on a maximum CB size configured between a base station and a terminal and attaching a CRC to the CBs. Embodiment 2-2 is an example of embodiment 2, which may include various alternative examples.

In this embodiment, a maximum value $K_{max}$ and a minimum value $K_{min}$ of a CB length may be pre-agreed between the base station and the terminal. In this embodiment, B denotes a size of a TB. In this embodiment, $L_{CB}$ denotes a length of a CRC being attached to a CB, and $L_{TB}$ denotes a length of a CRC being attached to a TB. In this embodiment, C denotes a number of CBs. In this embodiment, the base station may configure the maximum CB size $K_{max}$ and the minimum CB size to the terminal. In this embodiment, $N_{CB}$ may be a value greater than 0, which is pre-agreed between the transmitter and the receiver, and indicates the CRC length of the CB. In this embodiment, $\lceil X \rceil$ denotes an integer greater than X and $\lfloor X \rfloor$ denotes the greatest integer less than X. In this embodiment, $K_r$ denotes the length of the $r^{th}$ CB.

--- if $B \leq K_{max}$,
  $L_{CB} = 0$
  Number of code blocks: C=1
  B' = B
else
  $L_{CB} = N_{CB}$ Number of code blocks: $C = \left\lceil \dfrac{B}{K_{max} - L_{CB}} \right\rceil$ B' = B+C·$L_{CB}$
end if
if C=1,
  CB size $K_0 = \lceil B'/Kmin \rceil \cdot K_{min}$
  number of Filler bits $F_0 = K' \cdot C - B$
else
  temporary length of CB J= $\lceil B'/C \rceil$
  Temporary length of CB K'= $\lceil J/K_{min} \rceil \cdot K_{min}$
  Number of Filler bits $F_0 = K_0 - B$
  γ = F'modC
  for r = 0 to C-1
    if r ≤ C - γ-1
      filler bit of $r^{th}$ CB $F_r$ = [F/C]
      CB length of $r^{th}$ CB $K_r$ = [B'/C] + F,
    else
      filler bit of $r^{th}$ CB $F_r$ = $\lceil F/C \rceil$
      CB length of $r^{th}$ CB $K_r$ = |B'C| + F,
    end if
  end for r
end if
s = 0
for r = 0 to C-1
  for k = 0 to $K_r - F_r - 1$
    $C_{rk}$ = bs
    s = s+1
  end for k
  for k = $K_r - F_r - 1$ to $K_r - 1$
    $c_{rk}$ =<NULL>
    s = s+1
  end for k
end for

---

Although the description is directed to the exemplary case where no CRC is attached to the CB, it may be possible to modify, if a number of CBs is greater than 1, such that a CRC is attached every CB.

Embodiment 2-3

Embodiment 2-3 is directed to a method for a base station to determine a maximum CB size according to a type of data to be transmitted in order for a terminal to transmit/receive a signal based on the maximum CB size.

The type of data may be categorized based on the information contained in a control signal for scheduling the terminal. The information contained in the control signal may be delivered with predetermined bits or a specific RNTI value masked into a CRC attached to a downlink control signal (DCI). The RNTI value may indicate the type of the data being transmitted by the base station. For example, the specific RNTI value may be indicative of system information RNTI (SI-RNTI) or terminal-specific data (C-RNTI). For example, the maximum CB size may be set to 6144 for data transmission corresponding to the control signal to which the SI-RNTI is applied and 12288 for data transmission corresponding to the control signal to which the C-RNTI is applied. Alternatively, the maximum CB size may be set to 6144 for simultaneous data transmission to more one terminal and 12288 for data transmission to a specific terminal.

Embodiment 2-4

Embodiment 2-4 is directed to a method for determining the maximum CB size based on a TBS in use for data transmission between a base station and a terminal.

The base station and the terminal may pre-agree thresholds such as a first TBS threshold, a second TBS threshold, . . . , $M^{th}$ TBS threshold. It may be possible to determine the maximum CB size by comparing the TBS in use for actual data transmission with the TBS thresholds. For example, the maximum CB size may be set to 6144 for the TBS less than the first TBS threshold and 12288 for the TBS greater than the first TBS threshold.

Embodiment 2-5

Embodiment 2-5 is directed to a method for determining the maximum CB size based on an MCS value in use for data transmission between a base station and a terminal.

The base station and the terminal may pre-agree thresholds such as a first MCS threshold, a second MCS threshold, . . . , $M^{th}$ MCS threshold. It may be possible to determine the maximum CB size by comparing the MCS in use for actual data transmission with the MCS thresholds. For example, the maximum CB size may be set to 6144 for data transmission with an MCS less than the first MCS threshold and 12288 for data transmission with an MCS greater than the first MCS threshold.

Figure 20:
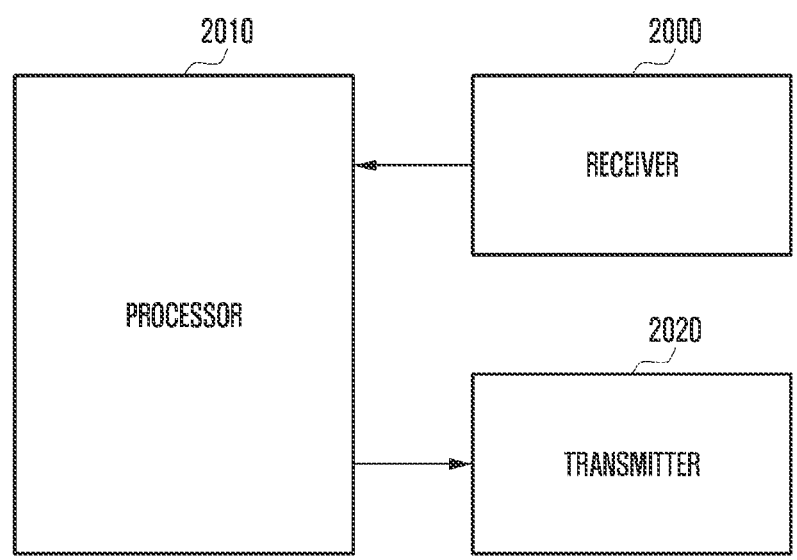
FIG. 20 is a block diagram illustrating a configuration of a terminal according to an embodiment of the present invention.
Figure 21:
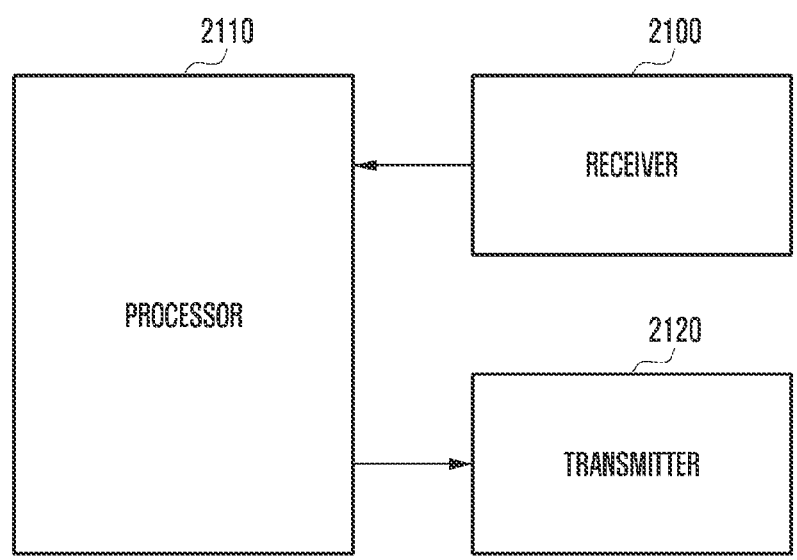
FIG. 21 is a block diagram illustrating a configuration of a base station according to an embodiment of the present invention.

The terminal and the base station composed, each, of a transmitter, a receiver, and a processor for implementing the methods of the above embodiments are depicted in FIGS. 20 and 21, respectively. In order to implement the method for determining a maximum CB size for use in data communication between the base station and the terminal as described in embodiments 2-1 to 2-5, the transmitter, receiver, and processor of each of the base station and the UE should operate as described in the respective embodiments.

FIG. 20 is a block diagram illustrating a configuration of a terminal according to an embodiment of the present invention. As shown in FIG. 20, the terminal may include a processor 2010, a receiver 2000, and a transmitter 2020. According to an embodiment of the present invention, the receiver 2000 and the transmitter 2020 may be collectively referred to as a transceiver. The transceiver may transmit and receive signals to and from a base station. The signals may include control information and data. The transceiver may include a radio frequency (RF) transmitter for frequency-up-converting and amplifying a signal to be transmitted and an RF receiver for low-noise-amplifying and frequency-down-converting a received signal. The transceiver may output the signal received over a radio channel to the processor 2010 and transmit the signal output from the processor 2010 over the radio channel.

According to an embodiment of the present invention, the processor 2010 may control overall operations of the UE. For example, the processor 2010 may control the receiver 2000 to receive a downlink data signal from a base station and perform CB decoding based on a preconfigured or predetermined maximum CB size. Afterward, the transmitter 2020 may transmit HARQ-ACK feedback information containing decoding result.

FIG. 21 is a block diagram illustrating a configuration of a base station according to an embodiment of the present invention. As shown in FIG. 21, the base station may include a processor 2110, a receiver 2100, and a transmitter 2120. According to an embodiment of the present invention, the receiver 2100 and the transmitter 2120 may be collectively referred to as a transceiver. The transceiver may transmit and receive signals to and from a terminal. The signals may include control information and data. The transceiver may include an RF transmitter for frequency-up-converting and amplifying a signal to be transmitted and an RF receiver for low-noise-amplifying and frequency-down-converting a received signal. The transceiver may output the signal received over a radio channel to the processor 2110 and transmit the signal output from the processor 2110 over the radio channel.

According to an embodiment of the present invention, the processor 2110 may control overall operations of the base station. For example, the processor 2110 may determine a maximum CB size and control to generate and transmit corresponding configuration information. Afterward, the transmitter 2020 generates CBs based on the maximum CB size and transmits CRC-attached CBs, and the receiver 2100 receives HARQ-ACK information from the terminal.

According to an embodiment of the present invention, the processor 2110 may control to generate downlink control information (DCI) or a higher layer signaling signal including the number of maximum CB size. In this case, the DCI or higher layer signaling signal may include information indicating whether the maximum CB size information on the scheduled signal is included therein.

The embodiments disclosed in the specification and drawings are proposed to help explain and understand the present invention rather than to limit the scope of the present invention. It is obvious to those skilled in the art that modifications and changes can be made thereto without departing from the spirit and scope of the present invention. If necessary, the embodiments may be combined in whole or in part. For example, the base station and the terminal may operate according to a combination of parts of embodiments 2-1, 2-2-1, and 2-4 of the present invention. Although the embodiments been directed to the FDD LTE system, the present invention can include alternative embodiments directed to other systems such as TDD LTE and 5G NR systems without departing from the technical sprit of the present invention.

What is claimed:

1. A method performed by a terminal in a wireless communication system, the method comprising:
    determining a maximum code block size based on a transport block size and modulation and coding scheme (MCS) information;
    determining a number of code blocks for the transport block; and
    segmenting the transport block into the determined number of code blocks,
    wherein in case that a sum of the transport block size and a transport block cyclic redundancy check (CRC) size is less than or equal to the maximum code block size, the number of code blocks for the transport block is determined as 1,
    wherein in case that the sum of the transport block size and the size of transport block CRC is greater than the maximum code block size, the number of code blocks for the transport block is determined by dividing a first value by a second value, and
    wherein the first value is the sum of the transport block size and the size of the transport block CRC and the second value is obtained by subtracting a code block CRC size from the maximum code block size.

2. The method of claim 1, further comprising performing low density parity check coding (LDPC) for the code blocks.

3. A method performed by a base station in a wireless communication system, the method comprising:
    determining a maximum code block size based on a transport block size and modulation and coding scheme (MCS) information;
    determining a number of code blocks for the transport block; and
    segmenting the transport block into the determined number of code blocks,
    wherein in case that a sum of the transport block size and a transport block cyclic redundancy check (CRC) size is less than or equal to the maximum code block size, the number of code blocks for the transport block is determined as 1,
    wherein in case that the sum of the transport block size and the size of transport block CRC is greater than the maximum code block size, the number of code blocks for the transport block is determined by dividing a first value by a second value, and
    wherein the first value is the sum of the transport block size and the size of the transport block CRC and the second value is obtained by subtracting a code block CRC size from the maximum code block size.

4. The method of claim 3, further comprising performing low density parity check coding (LDPC) for the code blocks.

5. A terminal in a wireless communication system, the terminal comprising:
a transceiver; and
a controller configured to:
determine a maximum code block size based on a transport block size and modulation and coding scheme (MCS) information,
determine a number of code blocks for the transport block, and
segment the transport block into the determined number of code blocks,
wherein in case that a sum of the transport block size and a transport block cyclic redundancy check (CRC) size is less than or equal to the maximum code block size, the number of code blocks for the transport block is determined as 1,
wherein in case that the sum of the transport block size and the size of transport block CRC is greater than the maximum code block size, the number of code blocks for the transport block is determined by dividing a first value by a second value, and
wherein the first value is the sum of the transport block size and the size of the transport block CRC and the second value is obtained by subtracting a code block CRC size from the maximum code block size.

6. The terminal of claim 5, wherein the controller is further configured to perform low density parity check coding (LDPC) for the code blocks.

7. A base station in a wireless communication system, the base station comprising:
a transceiver; and
a controller configured to:
determine a maximum code block size based on a transport block size and modulation and coding scheme (MCS) information,
determine a number of code blocks for the transport block, and
segment the transport block into the determined number of code blocks,
wherein in case that a sum of the transport block size and a transport block cyclic redundancy check (CRC) size is less than or equal to the maximum code block size, the number of code blocks for the transport block is determined as 1,
wherein in case that the sum of the transport block size and the size of transport block CRC is greater than the maximum code block size, the number of code blocks for the transport block is determined by dividing a first value by a second value, and
wherein the first value is the sum of the transport block size and the size of the transport block CRC and the second value is obtained by subtracting a code block CRC size from the maximum code block size.

8. The base station of claim 7, wherein the controller is further configured to perform low density parity check coding (LDPC) for the code blocks.

* * * * *